US011912442B2

(12) United States Patent
Seung et al.

(10) Patent No.: US 11,912,442 B2
(45) Date of Patent: Feb. 27, 2024

(54) FUEL CELL POWER PACK-INTEGRATED DRONE

(71) Applicant: DOOSAN MOBILITY INNOVATION INC., Yongin (KR)

(72) Inventors: Myeong Hun Seung, Incheon (KR); Gyu Jung Shim, Anyang (KR)

(73) Assignee: DOOSAN MOBILITY INNOVATION INC., Yongin (KR)

( * ) Notice: Subject to any disclaimer, the term of this patent is extended or adjusted under 35 U.S.C. 154(b) by 449 days.

(21) Appl. No.: 17/270,482

(22) PCT Filed: Aug. 28, 2019

(86) PCT No.: PCT/KR2019/011021
§ 371 (c)(1),
(2) Date: Feb. 23, 2021

(87) PCT Pub. No.: WO2020/045995
PCT Pub. Date: Mar. 5, 2020

(65) Prior Publication Data
US 2021/0323668 A1 Oct. 21, 2021

(30) Foreign Application Priority Data

Aug. 31, 2018 (KR) .................. 10-2018-0103816

(51) Int. Cl.
*B64U 50/32* (2023.01)
*B60L 50/70* (2019.01)
(Continued)

(52) U.S. Cl.
CPC .............. *B64U 50/32* (2023.01); *B60L 50/70* (2019.02); *B64D 37/04* (2013.01);
(Continued)

(58) Field of Classification Search
CPC .......................... B64C 39/024; B60L 2220/10
See application file for complete search history.

(56) References Cited

U.S. PATENT DOCUMENTS

| 5,062,441 A | 11/1991 | Glukhov |
| 2003/0075643 A1 | 4/2003 | Dunn |
(Continued)

FOREIGN PATENT DOCUMENTS

| JP | 2017530042 A | 10/2017 |
| KR | 101806261 B1 | 12/2017 |
(Continued)

OTHER PUBLICATIONS

OA dated Apr. 8, 2022 by the PTO(EP).
EP Search Report dated Apr. 8, 2022.
The OA corresponding CN application dared Dec. 6, 2023.

*Primary Examiner* — Richard G Davis
(74) *Attorney, Agent, or Firm* — Harvest IP Law, LLP

(57) ABSTRACT

A drone equipped with fuel cell power pack capable of reducing weight by supplying power from a fuel cell while enabling long-term operation of a drone is provided. The drone equipped with fuel cell power pack may include a case including a wing part placed along an outer circumference of the case, a module frame placed in the case, a fuel cell unit placed in the module frame with a weight balance; and a gas tank mounted on the module frame and connected to the fuel cell unit. Because an overall weight balance of the fuel cell power pack itself can be maintained, even if it is integrally mounted inside the drone, the stable operation of the drone can be achieved.

17 Claims, 31 Drawing Sheets

(51) Int. Cl.
  *B64D 37/04*      (2006.01)
  *H01M 8/04082*    (2016.01)
  *H01M 10/0525*    (2010.01)
  *H01M 16/00*      (2006.01)
  *H01M 8/04089*    (2016.01)
  *B64U 10/13*      (2023.01)
  *B64U 50/19*      (2023.01)

(52) U.S. Cl.
  CPC ... *H01M 8/04089* (2013.01); *H01M 8/04201* (2013.01); *H01M 10/0525* (2013.01); *H01M 16/006* (2013.01); *B60L 2200/10* (2013.01); *B64U 10/13* (2023.01); *B64U 50/19* (2023.01); *H01M 2220/20* (2013.01); *H01M 2250/20* (2013.01)

(56) References Cited

U.S. PATENT DOCUMENTS

| | | |
|---|---|---|
| 2011/0071707 A1 | 3/2011 | Crumm |
| 2016/0221676 A1 | 8/2016 | Fisher et al. |
| 2017/0200961 A1 | 7/2017 | Zheng |
| 2017/0240291 A1 | 8/2017 | Kim |
| 2018/0155021 A1 | 6/2018 | Patterson |

FOREIGN PATENT DOCUMENTS

| | | | |
|---|---|---|---|
| KR | 101866191 B1 | 6/2018 | |
| WO | 2018046990 A | 3/2018 | |
| WO | WO-2018046990 A1 * | 3/2018 | |
| WO | 2018074720 A1 | 4/2018 | |
| WO | WO-2018074720 A1 * | 4/2018 | ............. B64C 27/08 |

* cited by examiner

[FIG. 1]
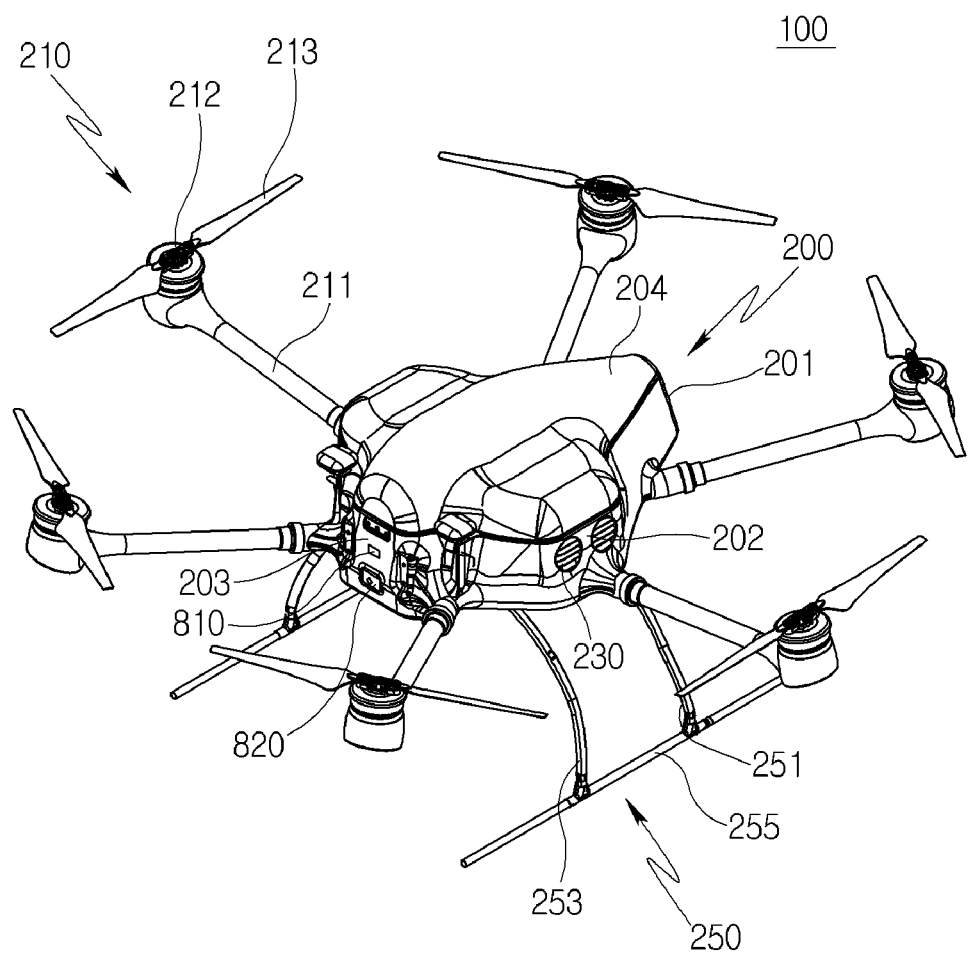

[FIG. 2]
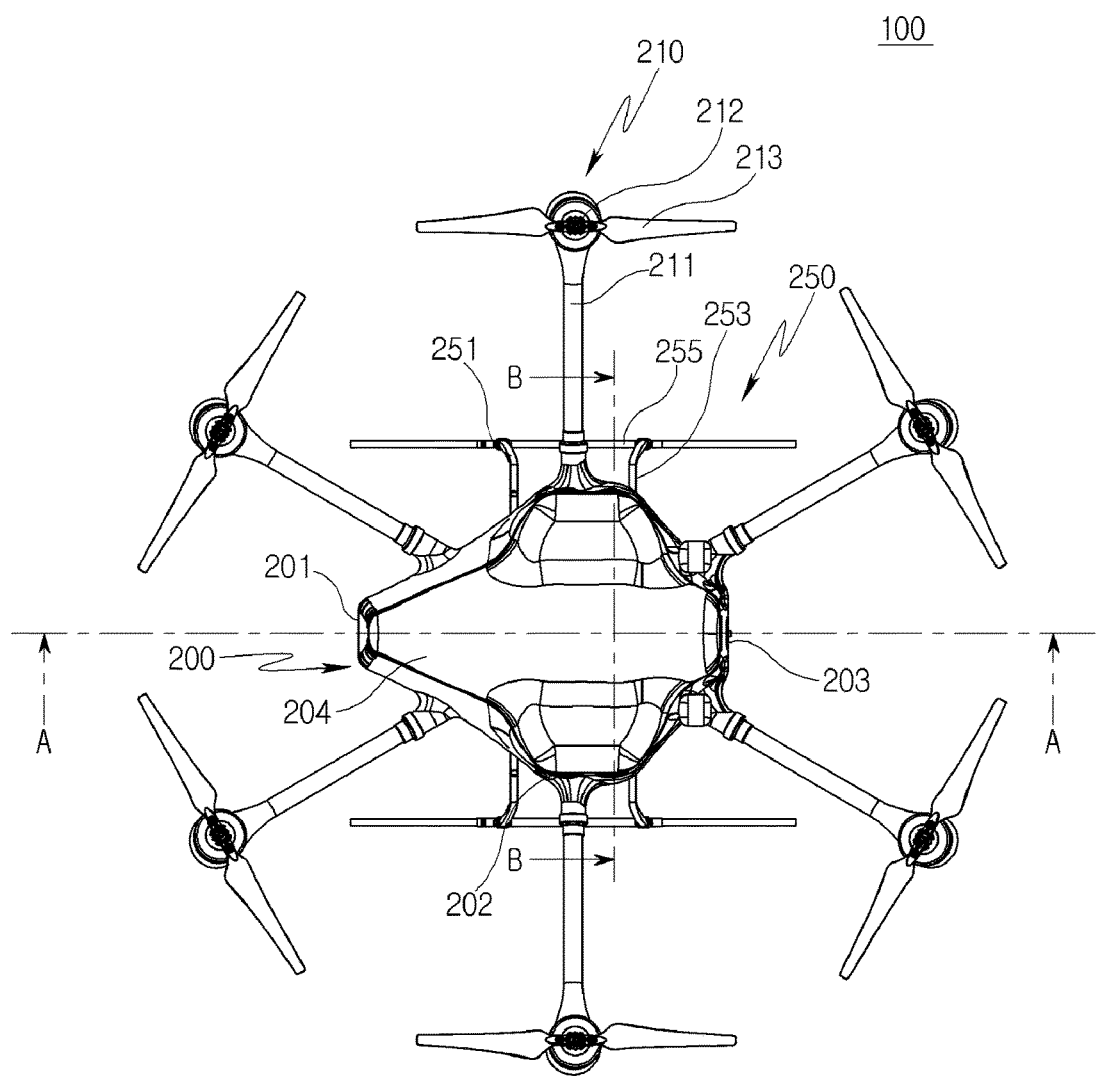

[FIG. 3]
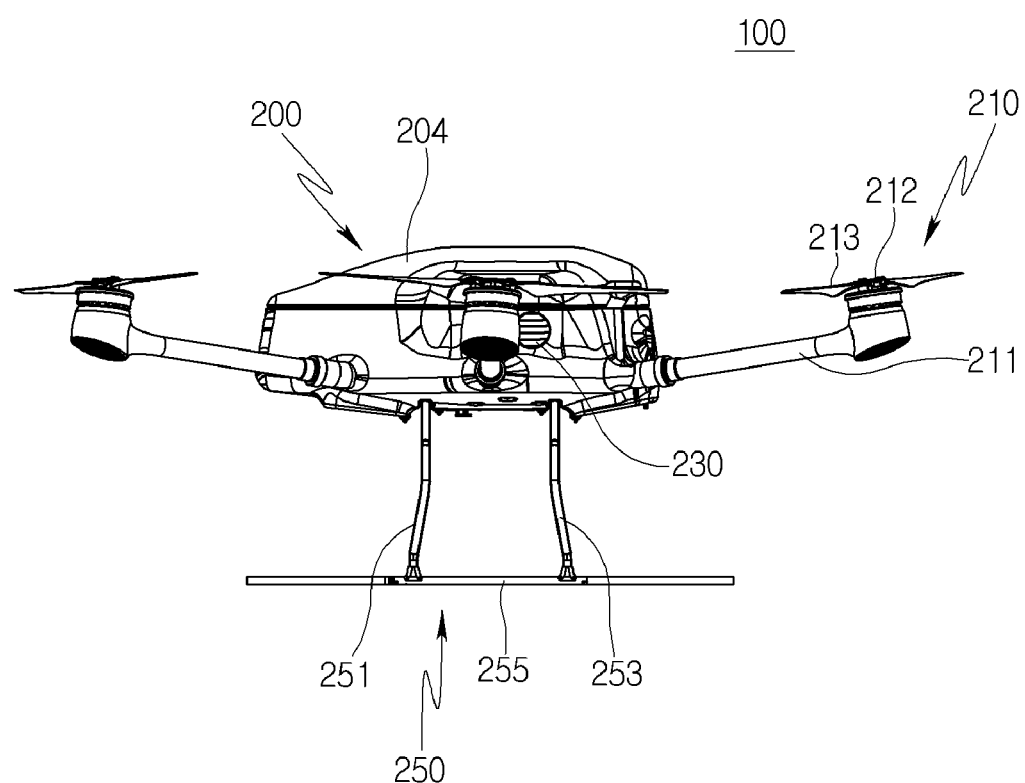

【FIG. 4】
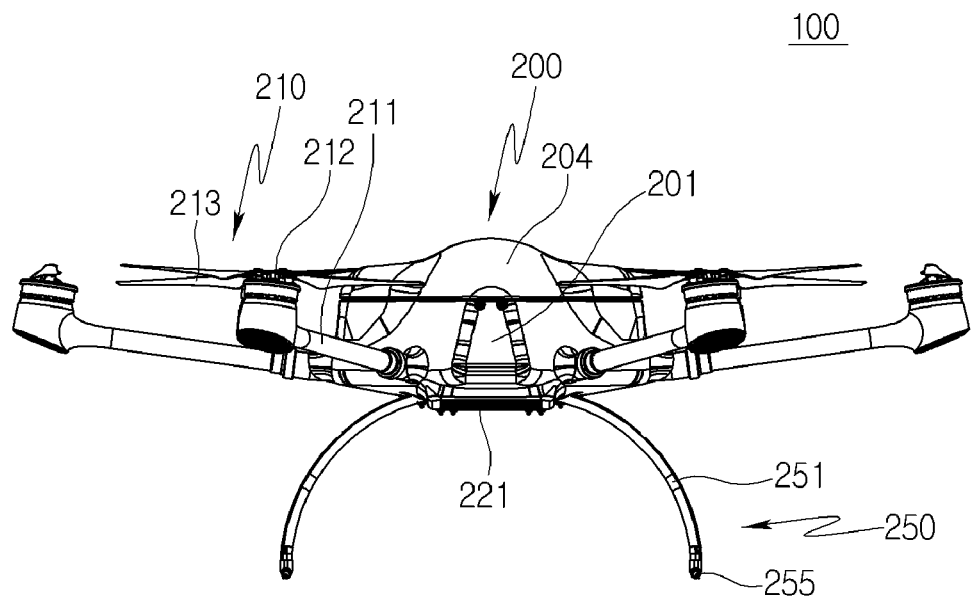
【FIG. 5】
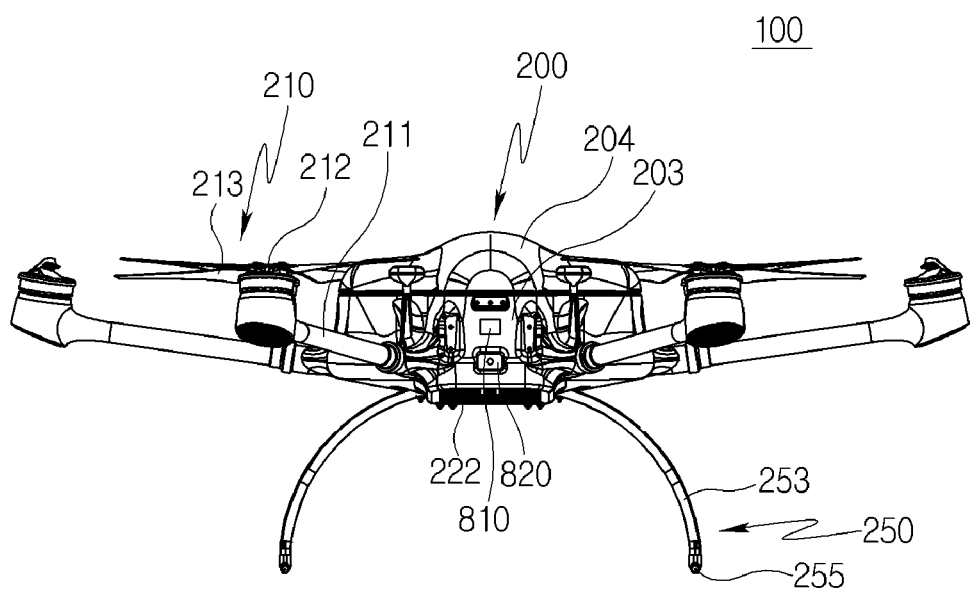

[FIG. 6]
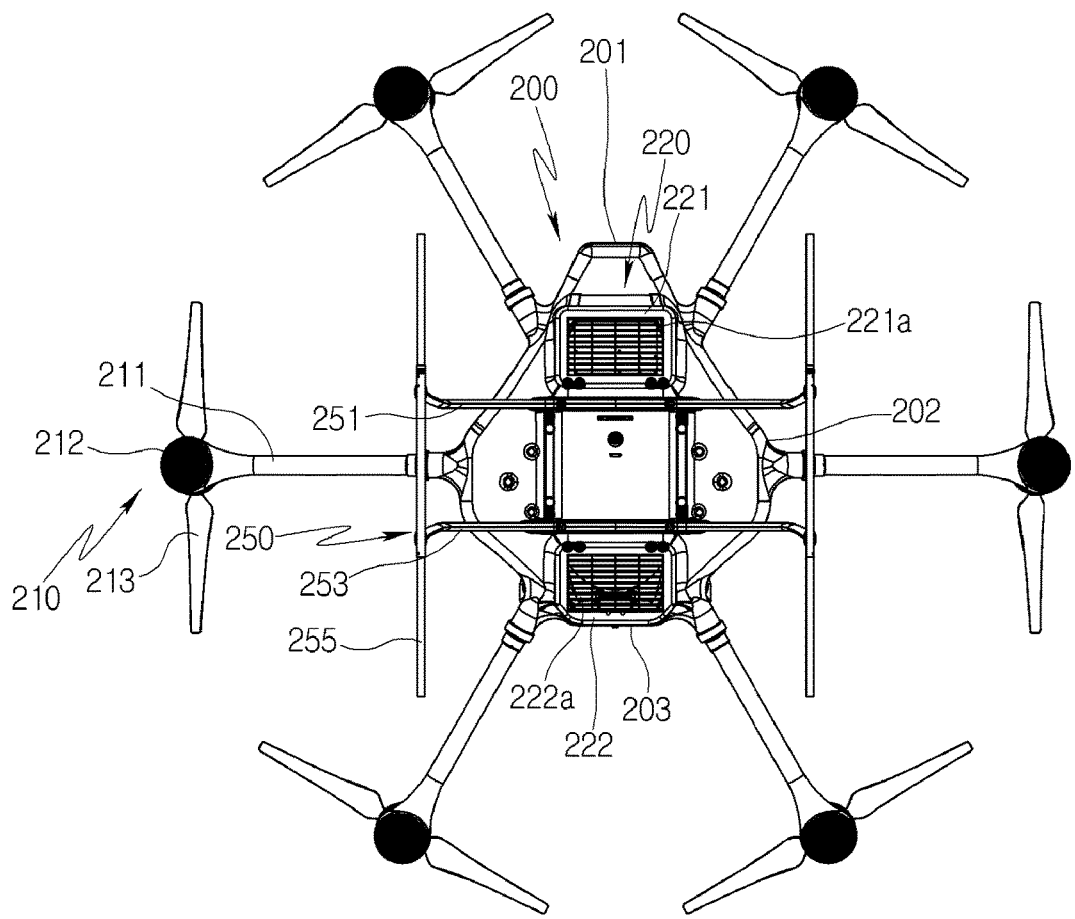

[FIG. 7]
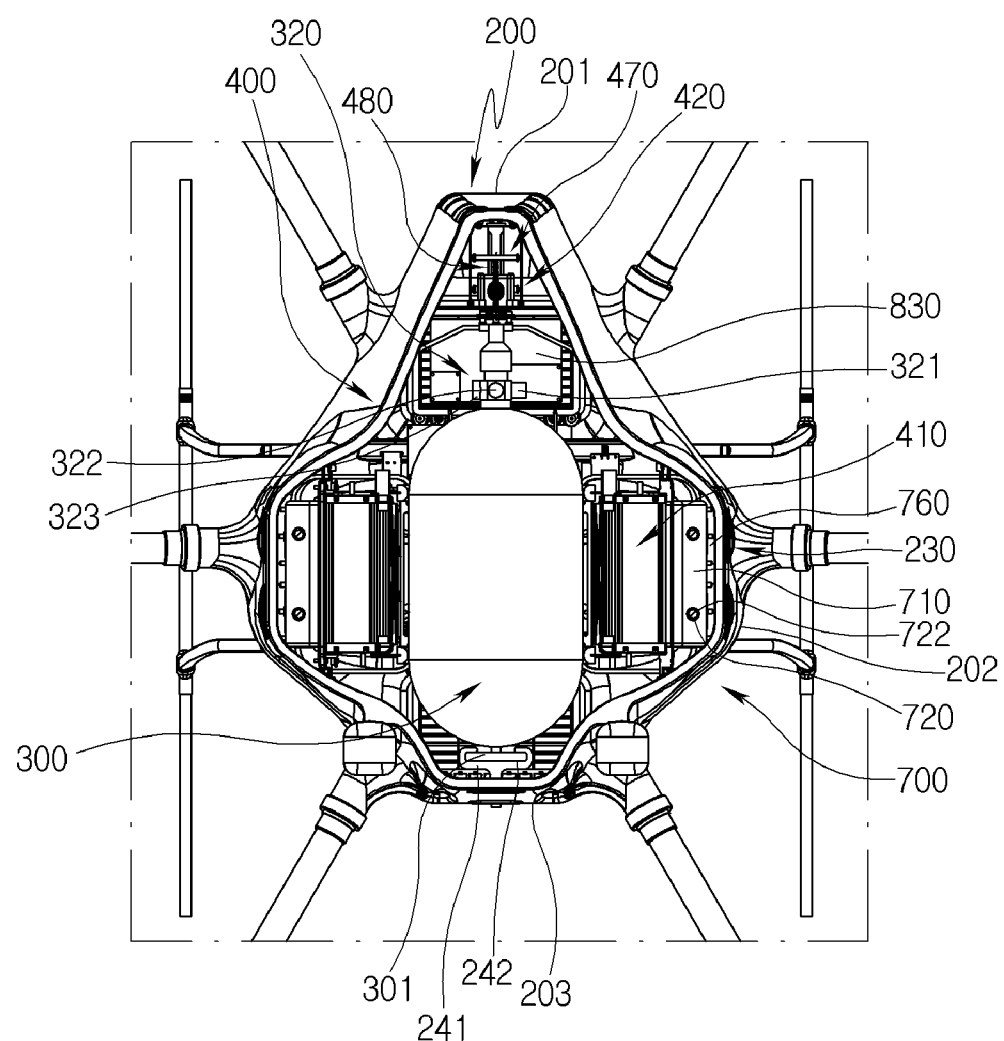

[FIG. 8]
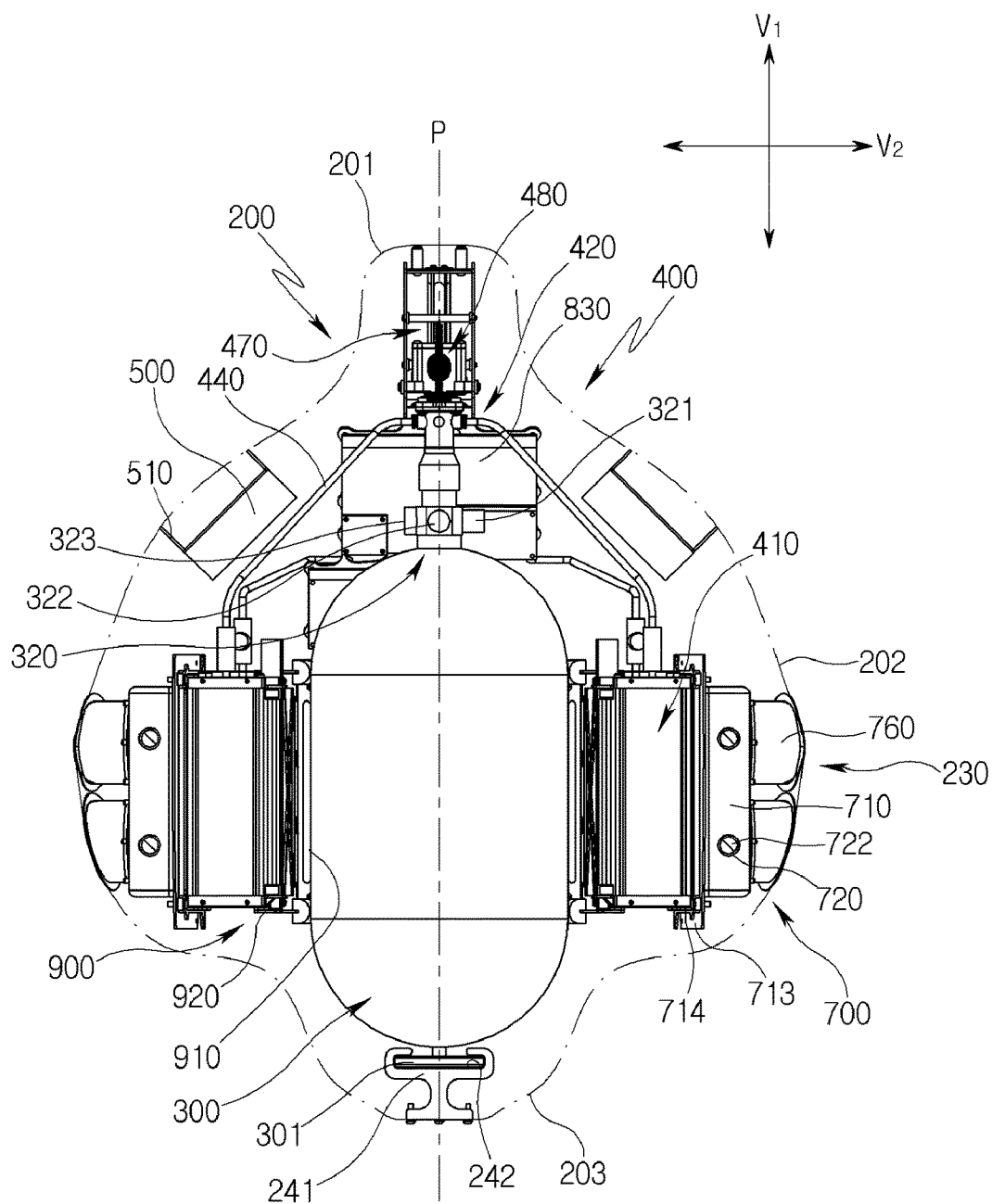

[FIG. 9]
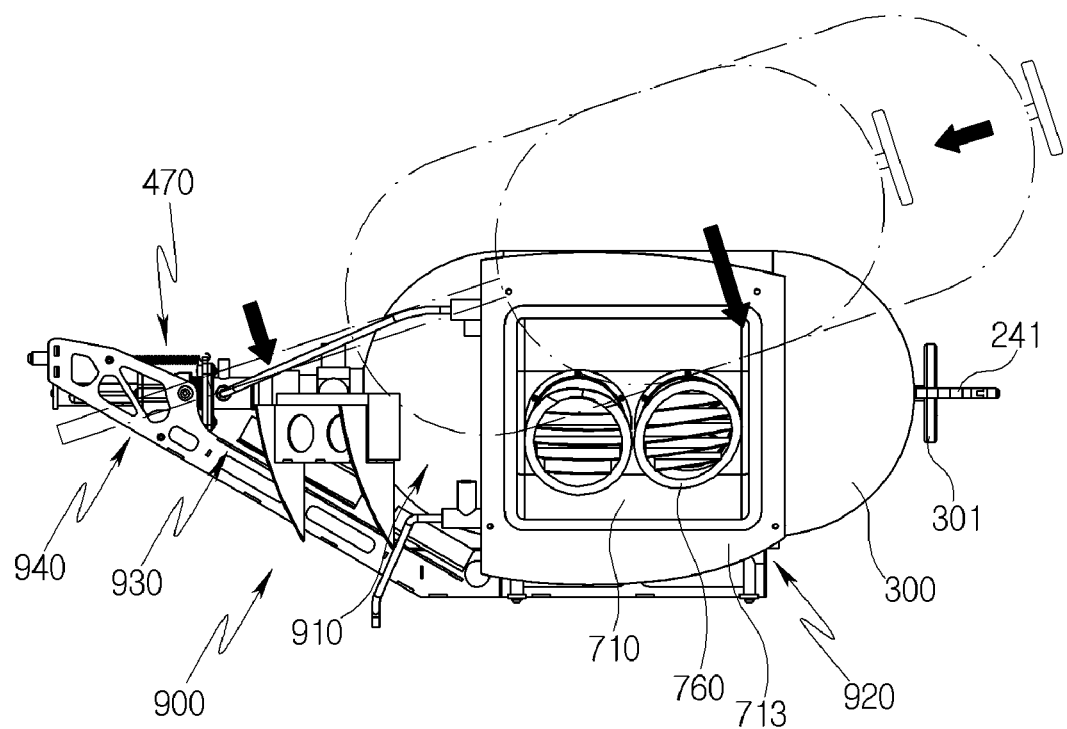

[FIG. 10]
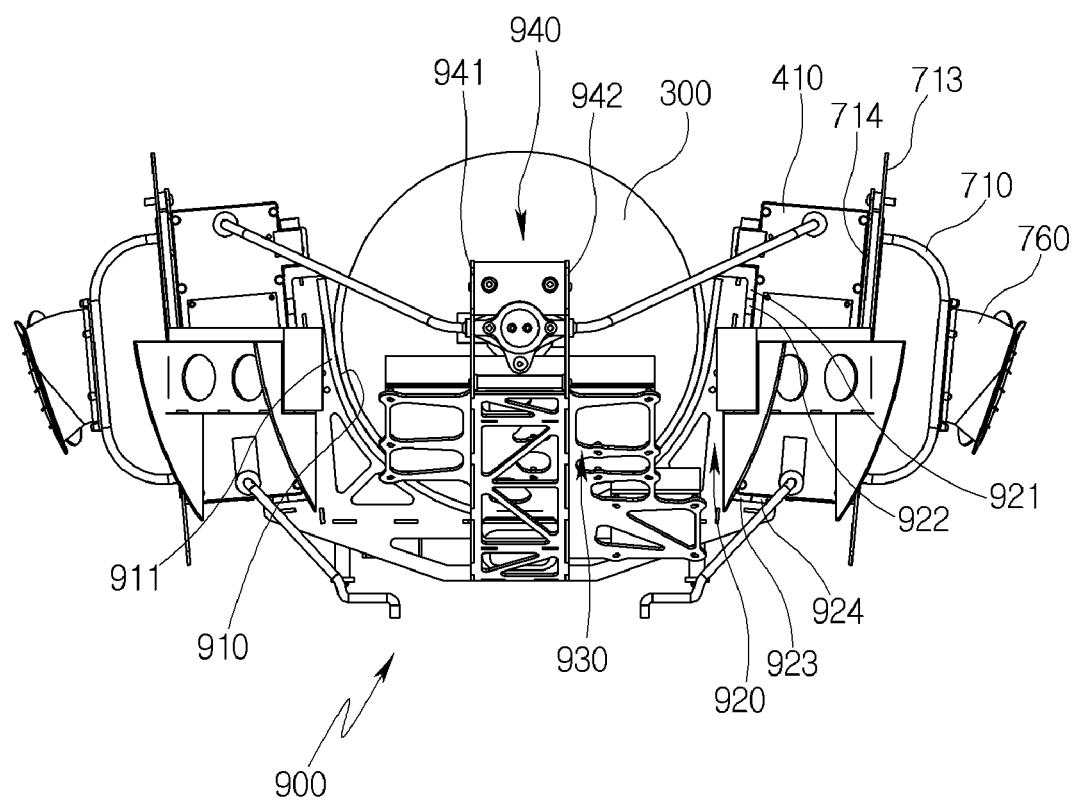

[FIG. 11]
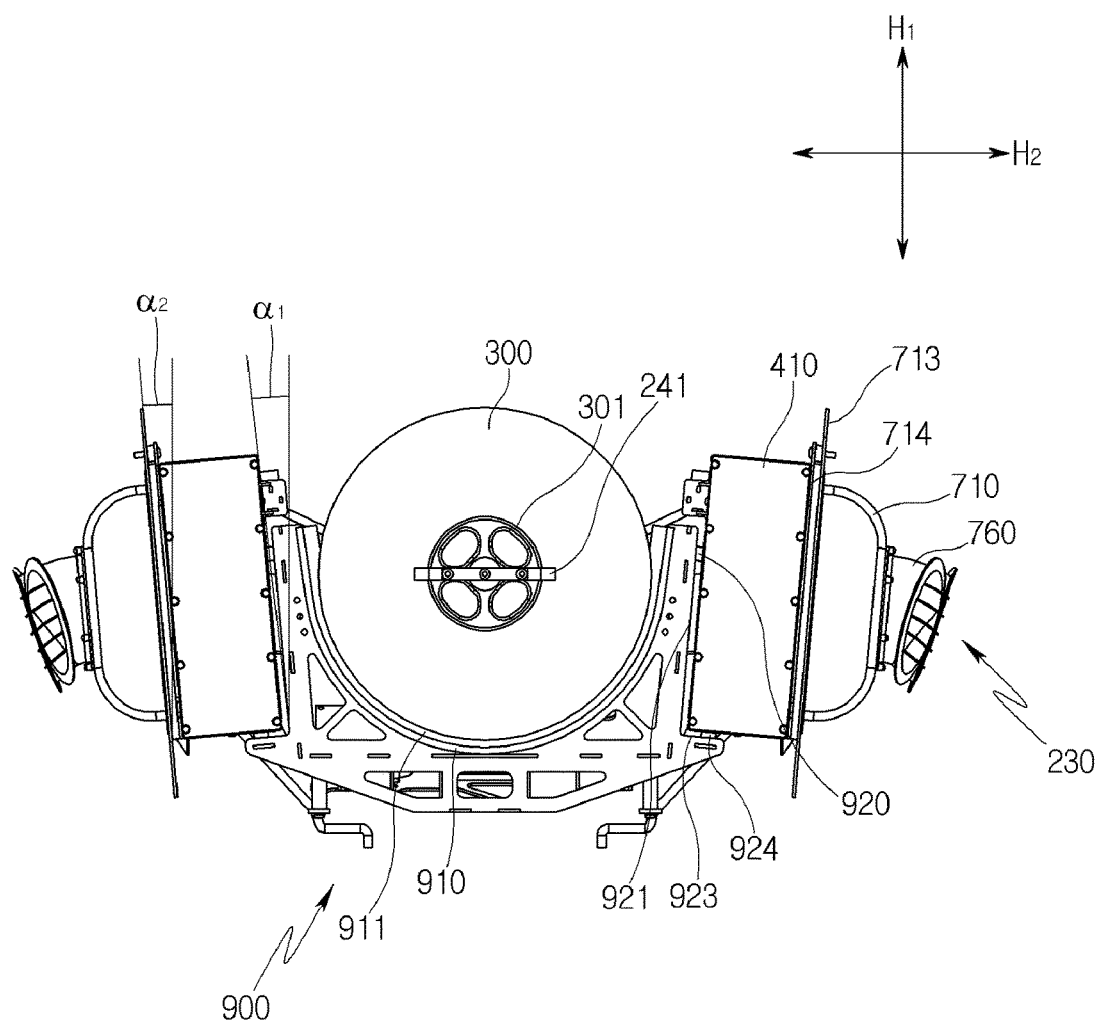

[FIG. 12]
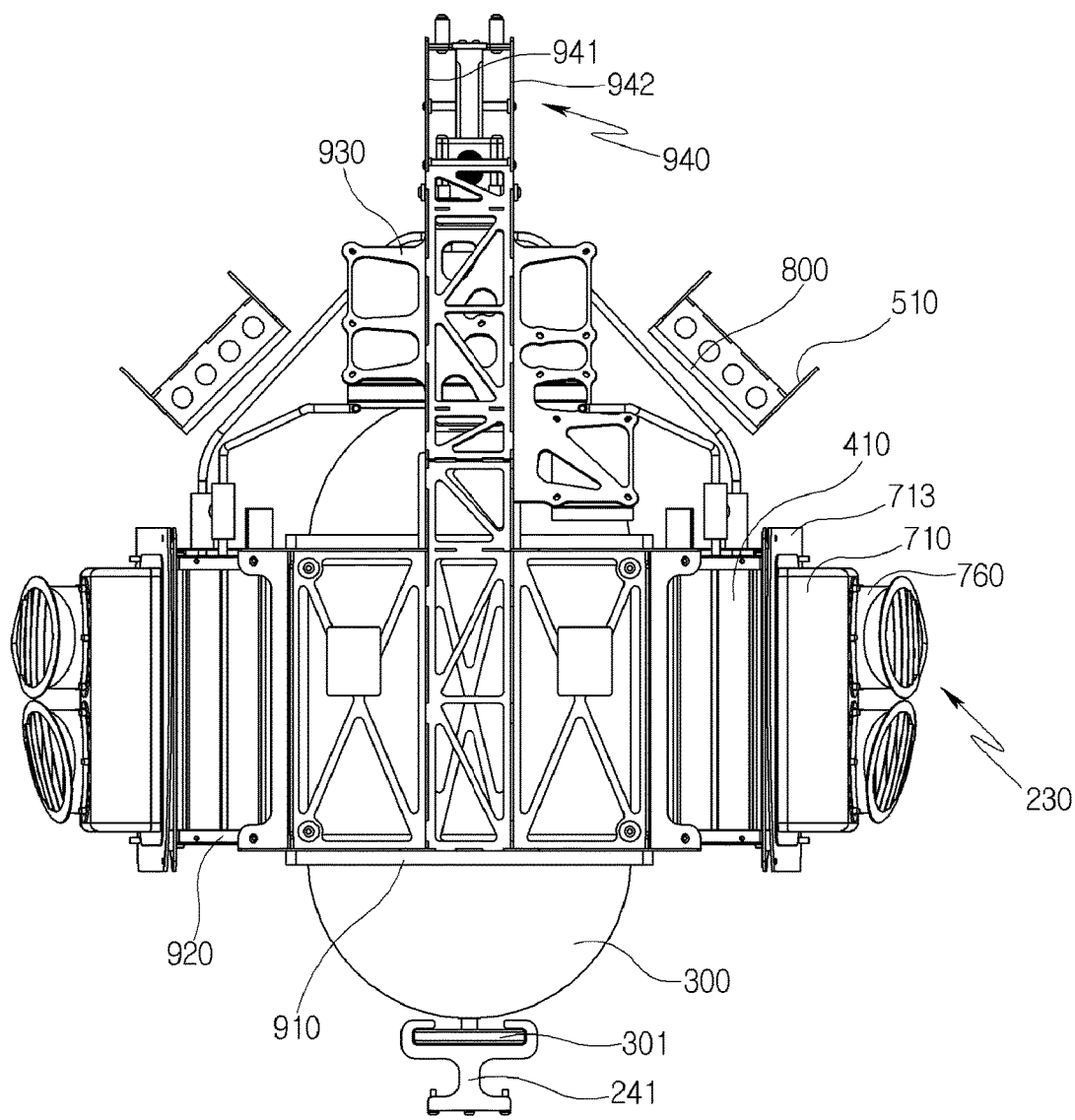

[FIG. 13]
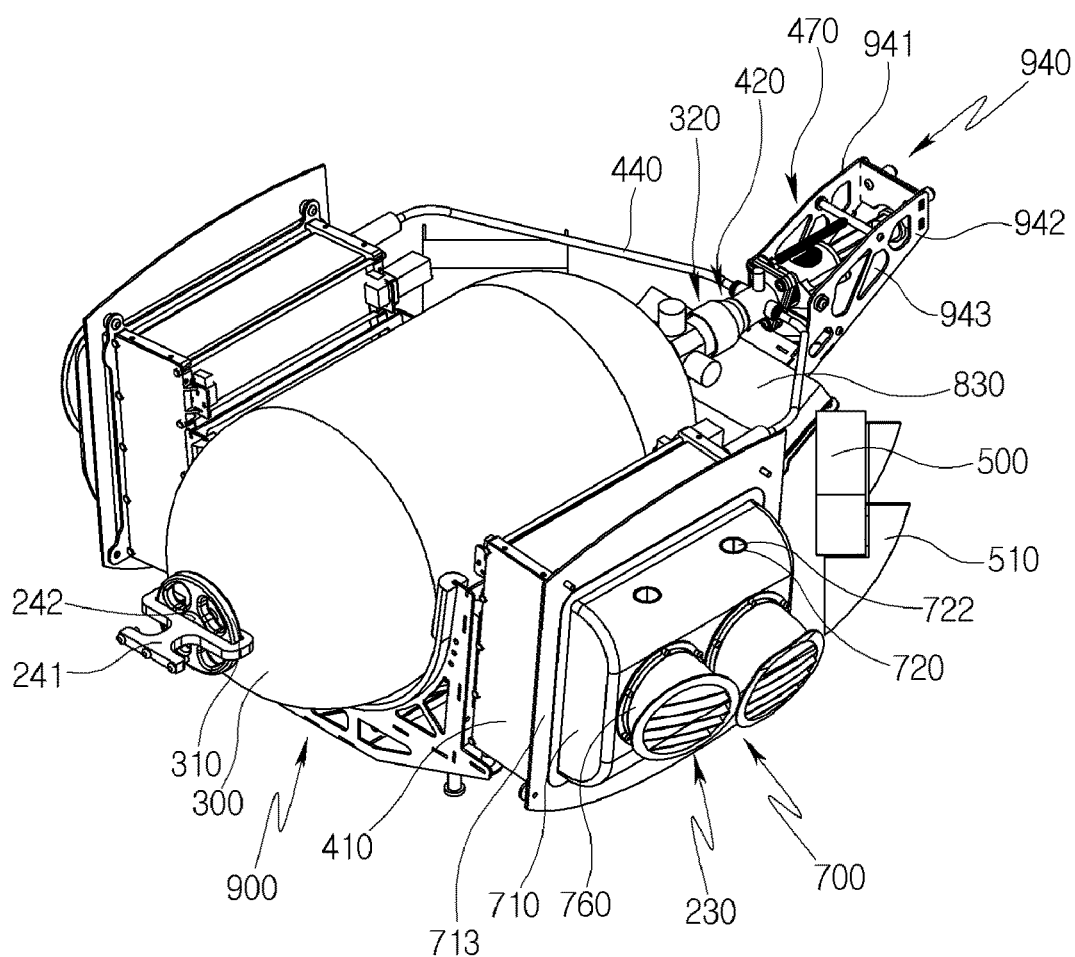

[FIG. 14]
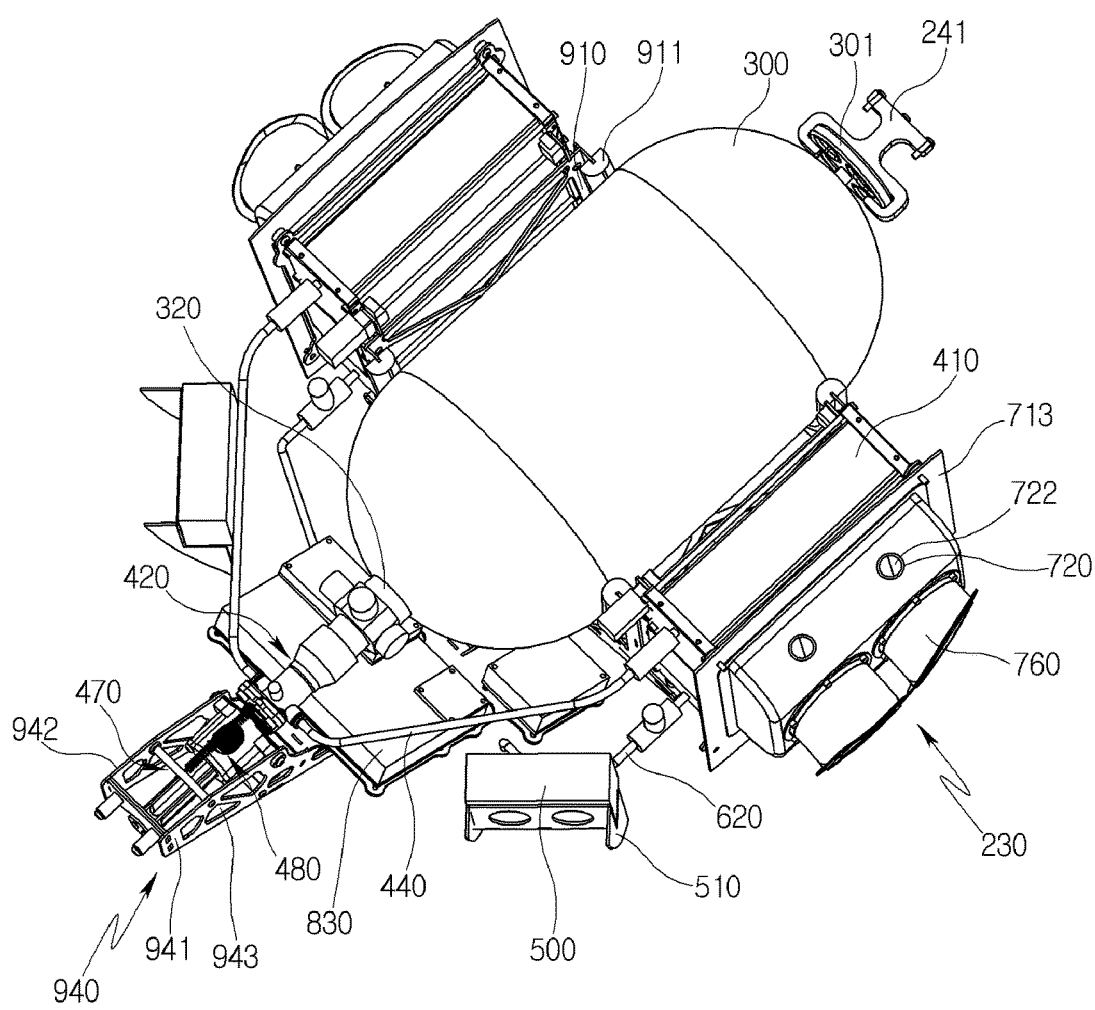

[FIG. 15]
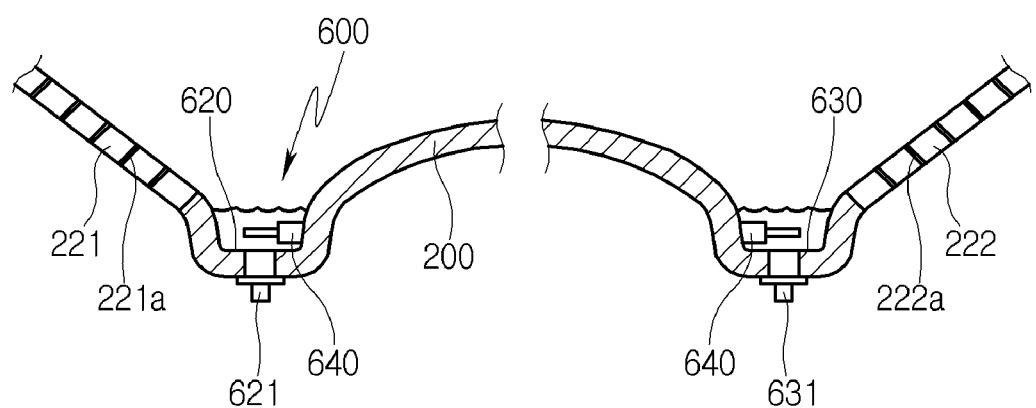
[FIG. 16]
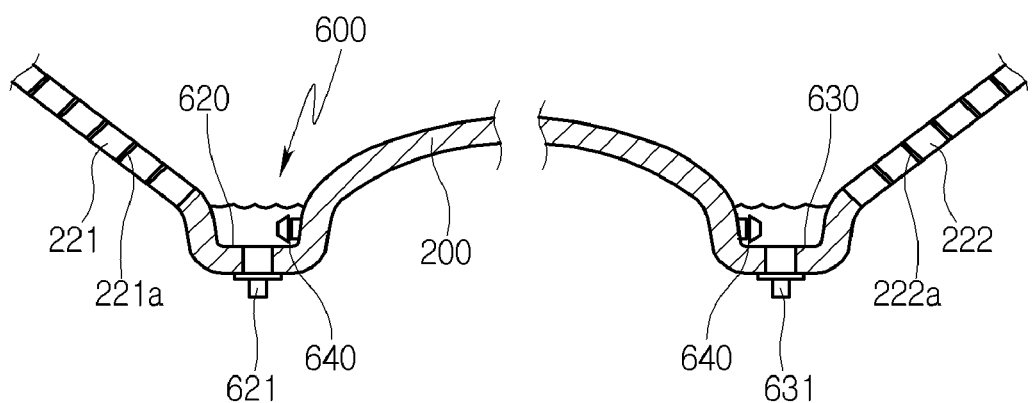

[FIG. 17]
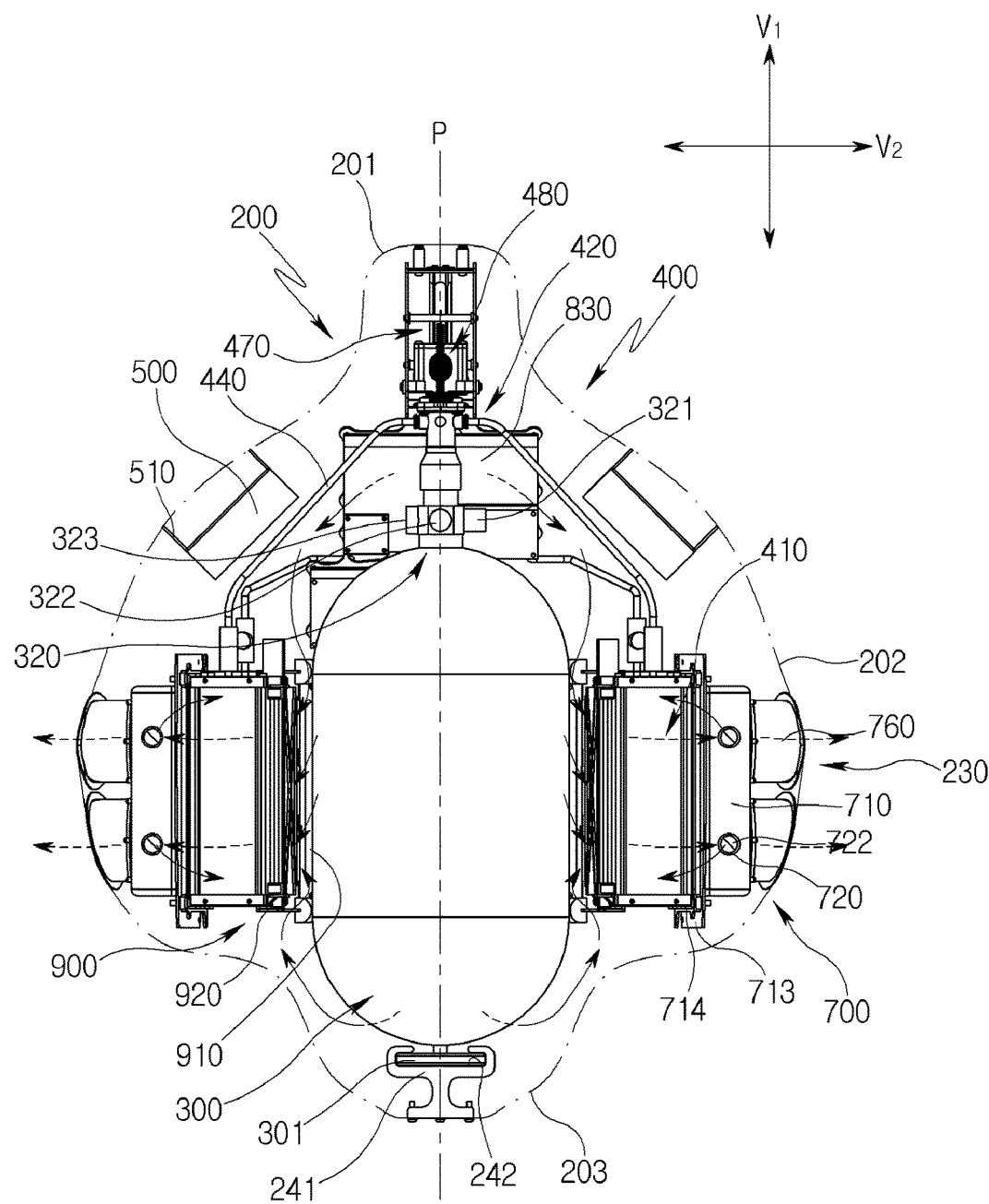

[FIG. 18a]
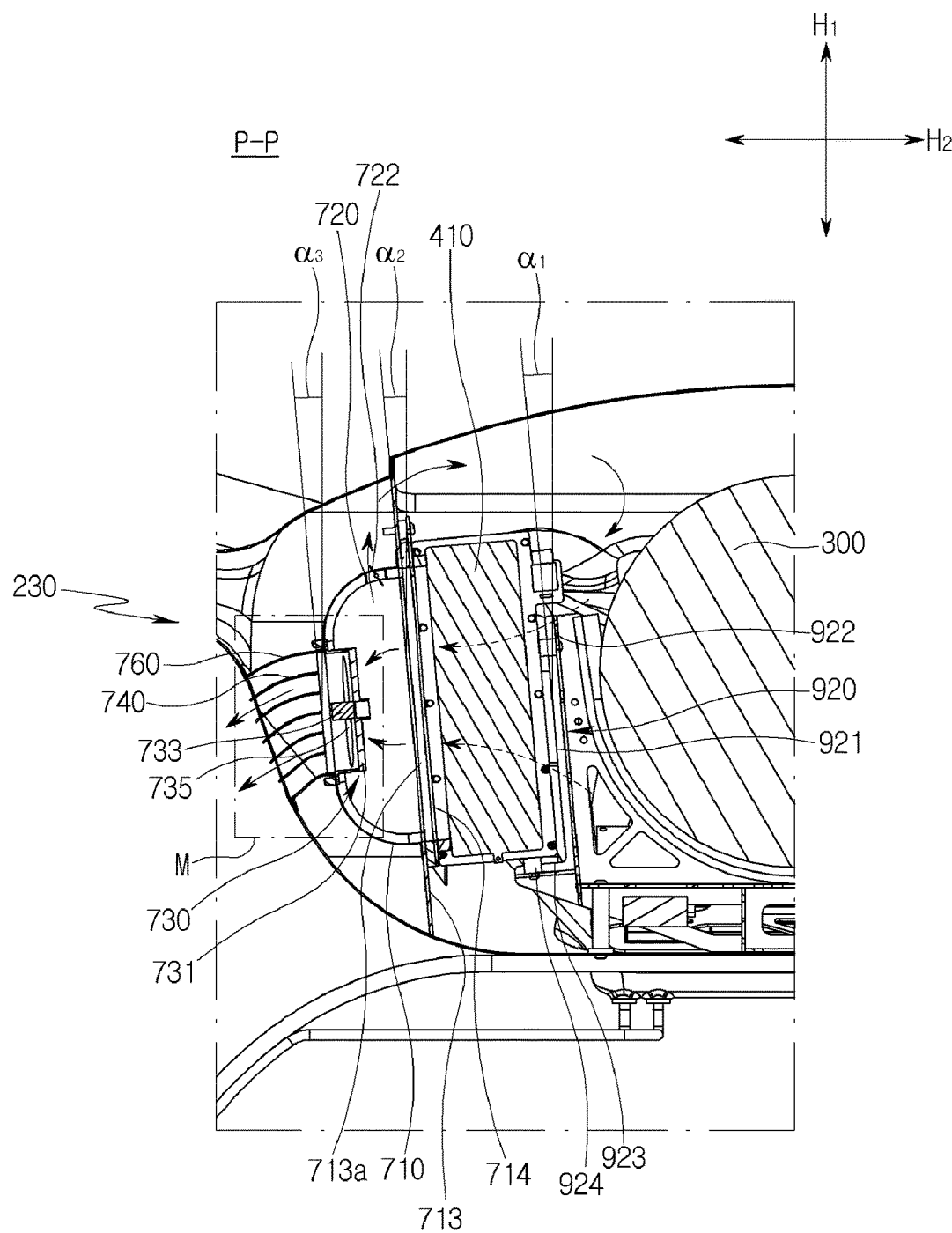

[FIG. 18b]
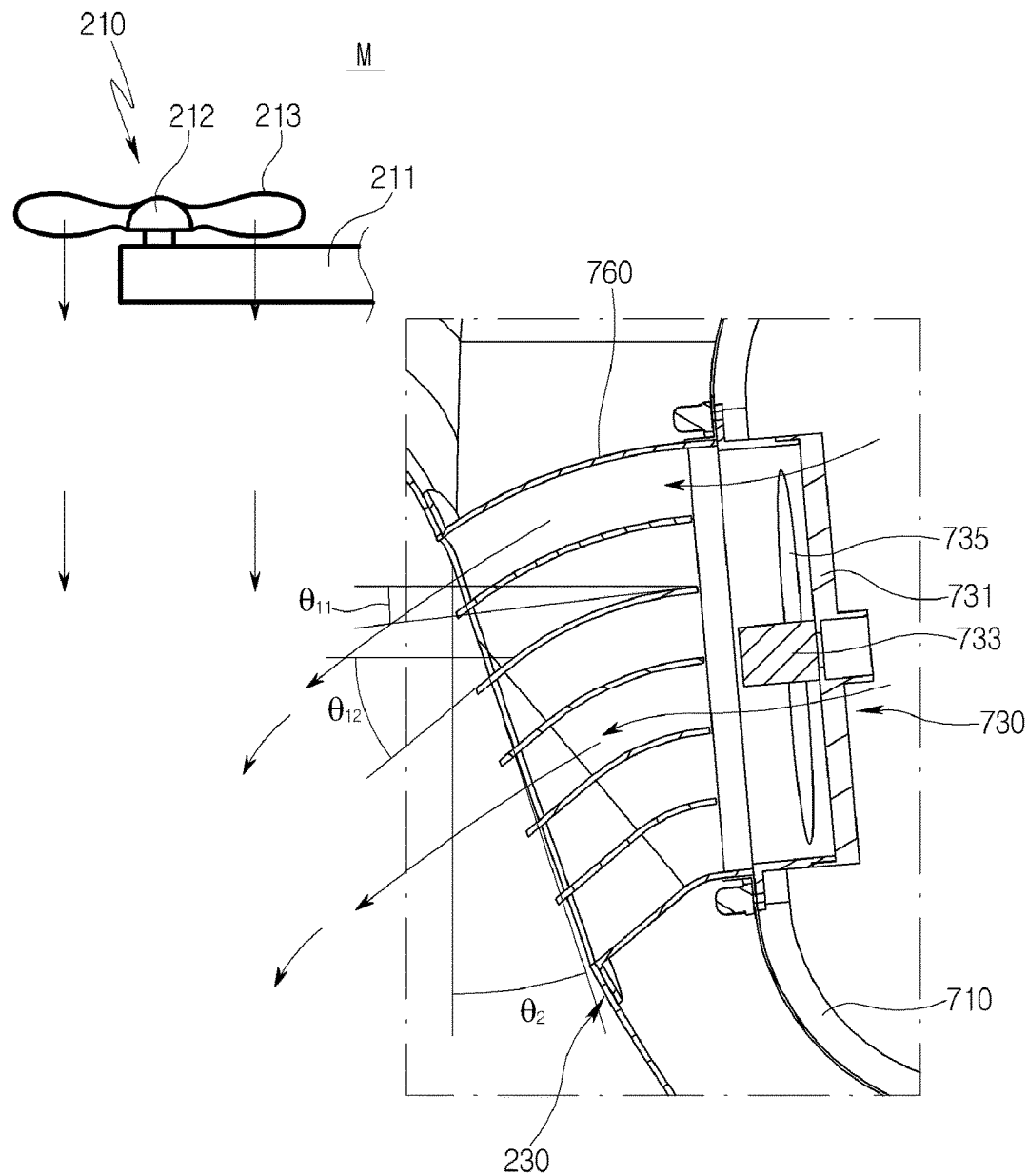

[FIG. 19a]
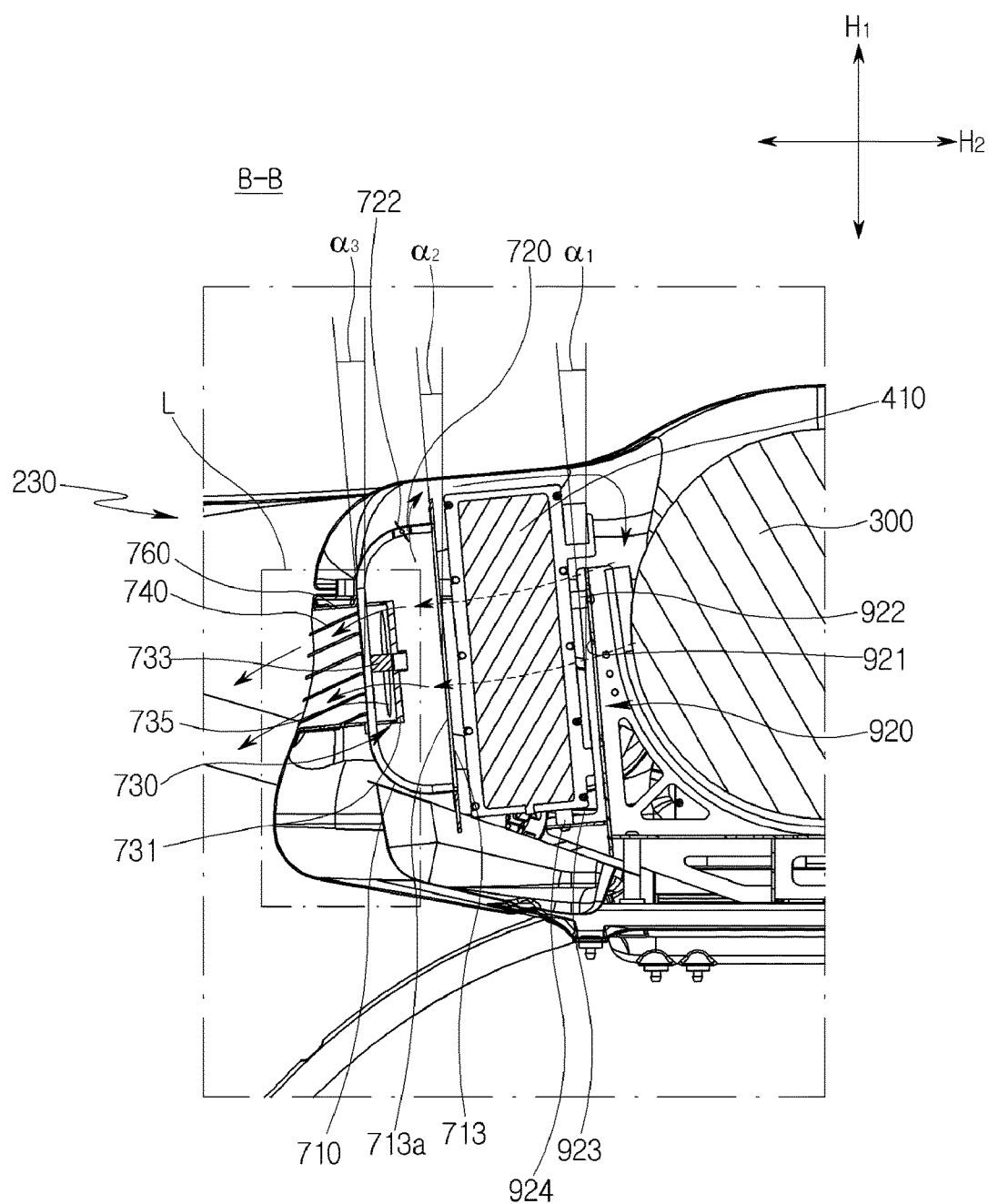

[FIG. 19b]
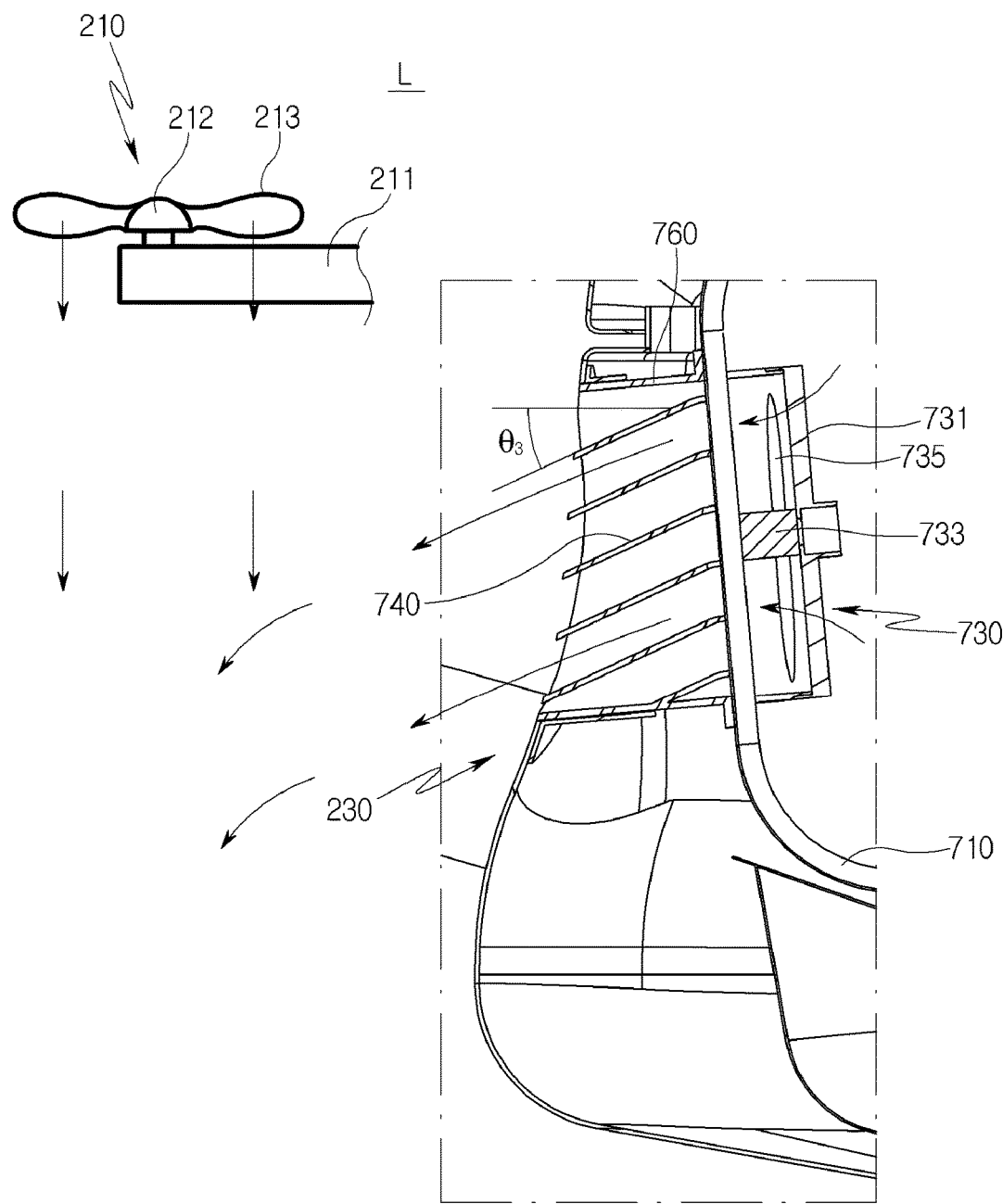

[FIG. 20]
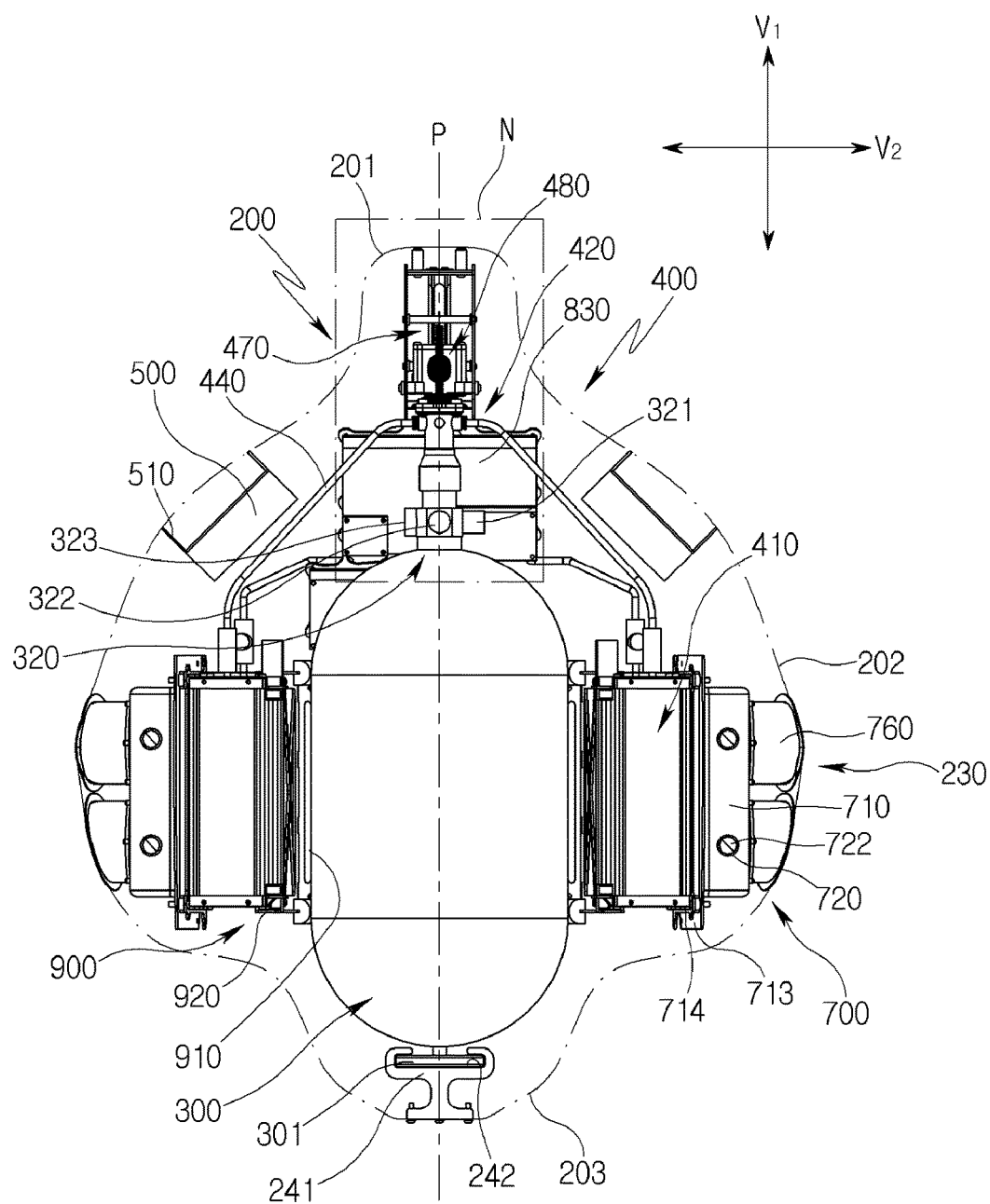

[FIG. 21]
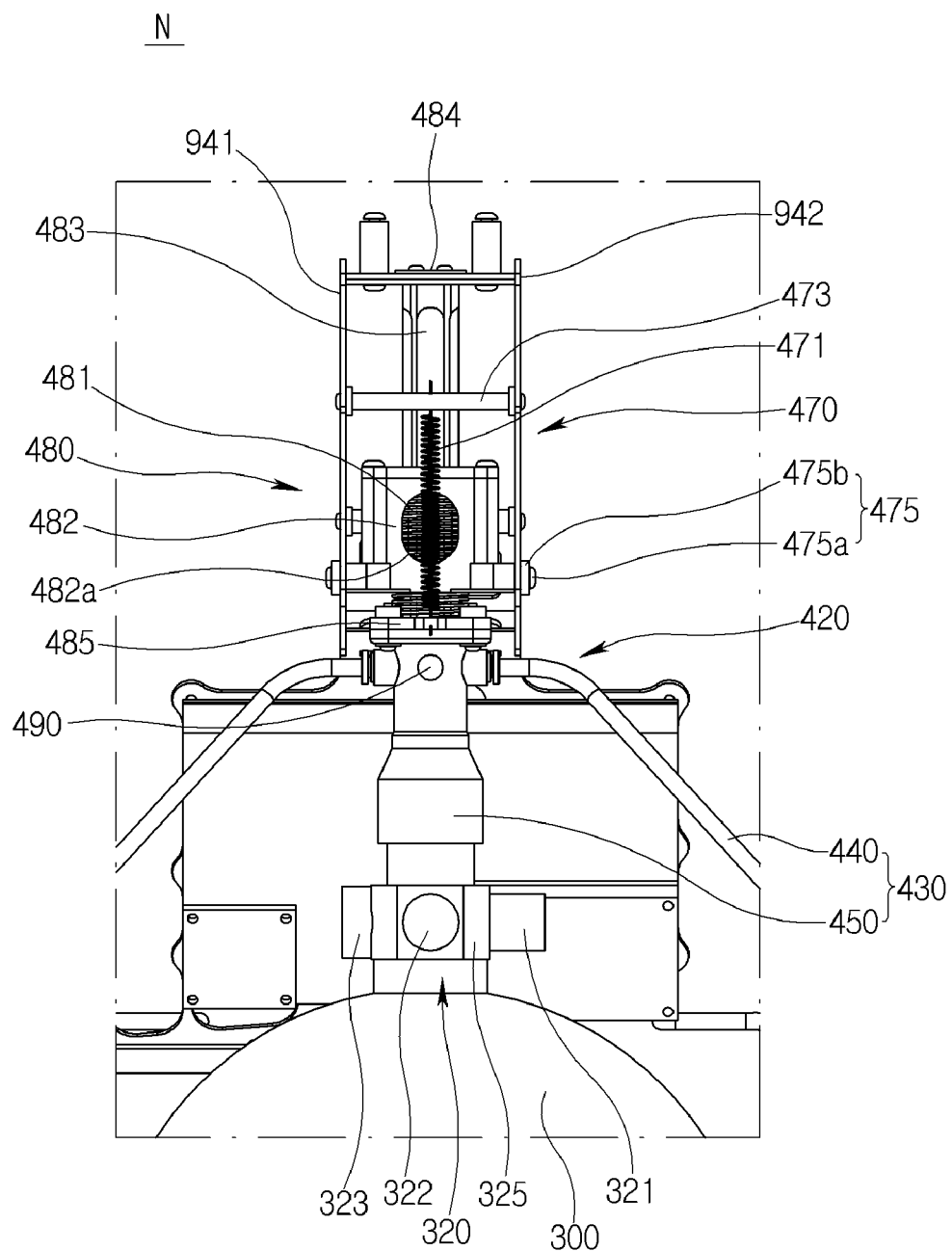

[FIG. 22]
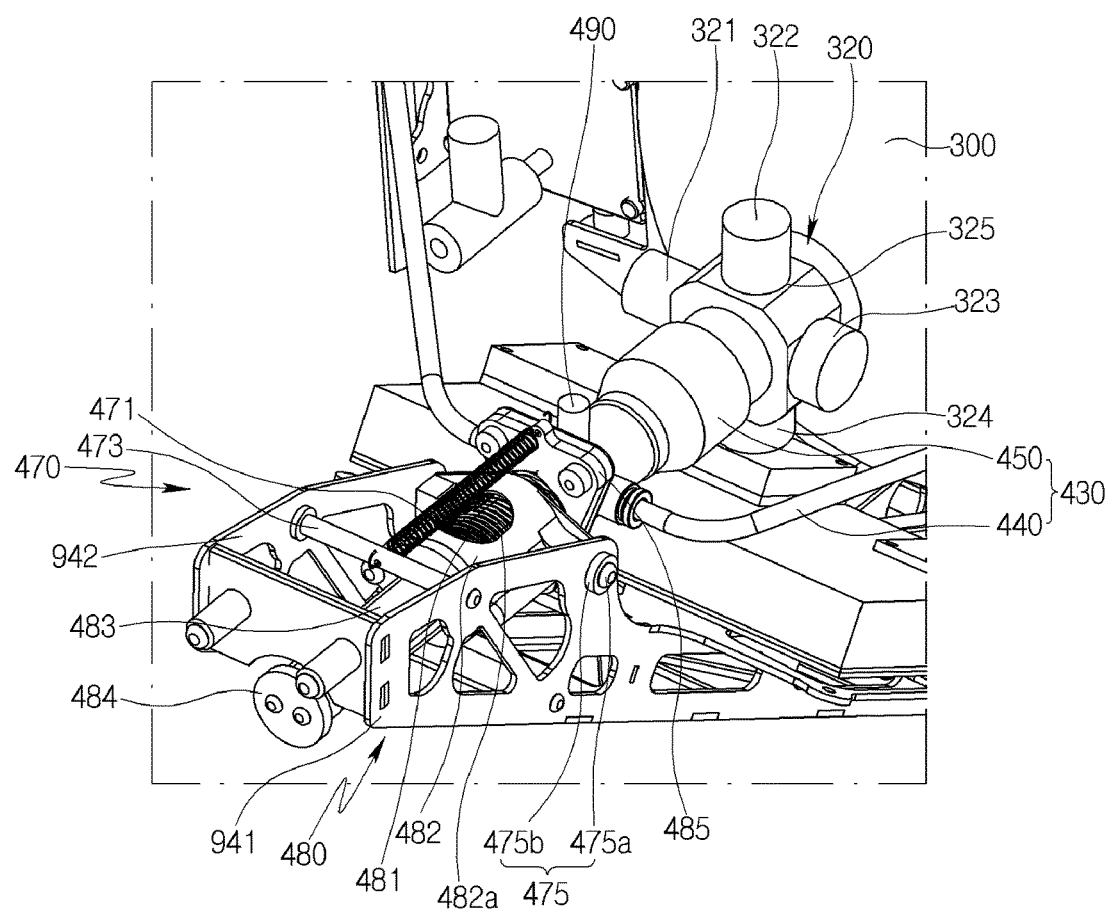

[FIG. 23]
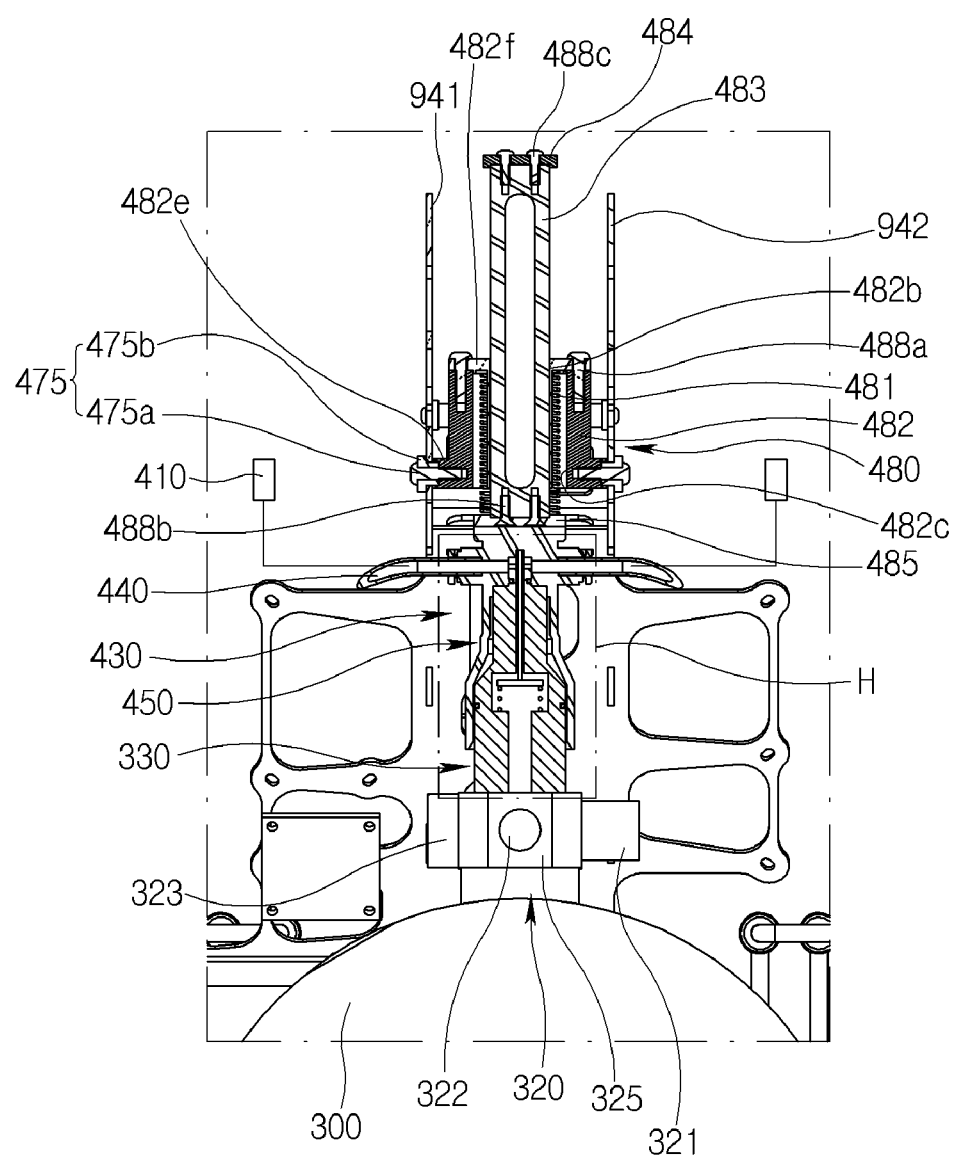

[FIG. 24]
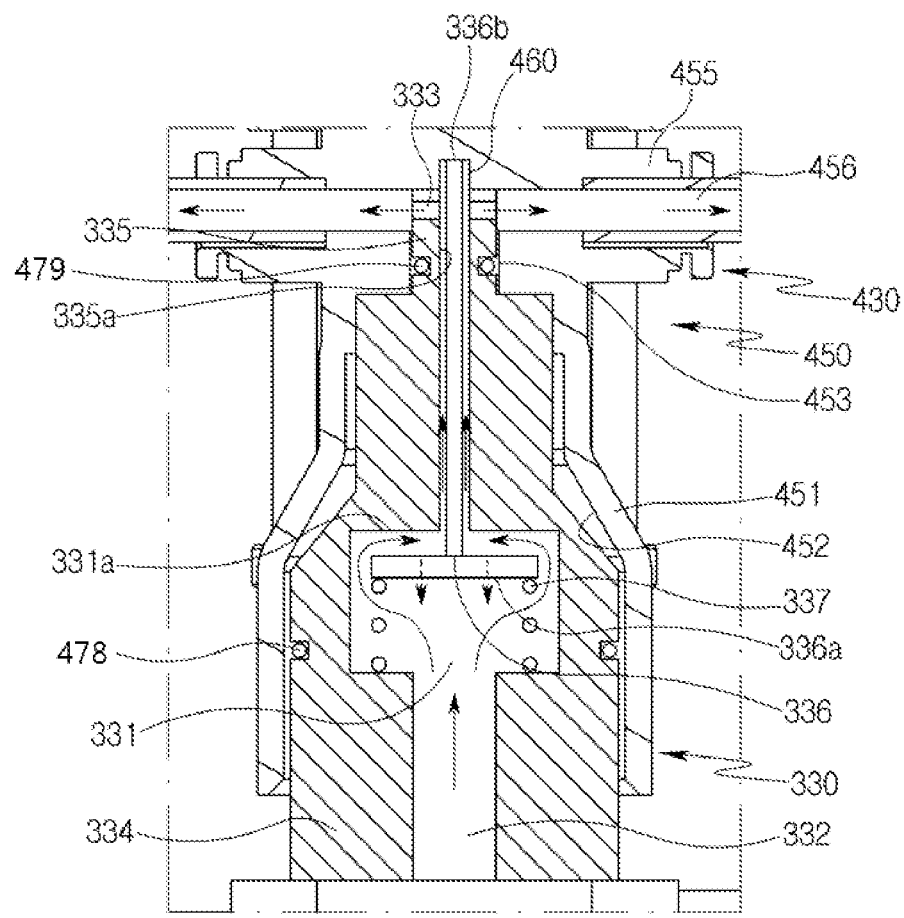

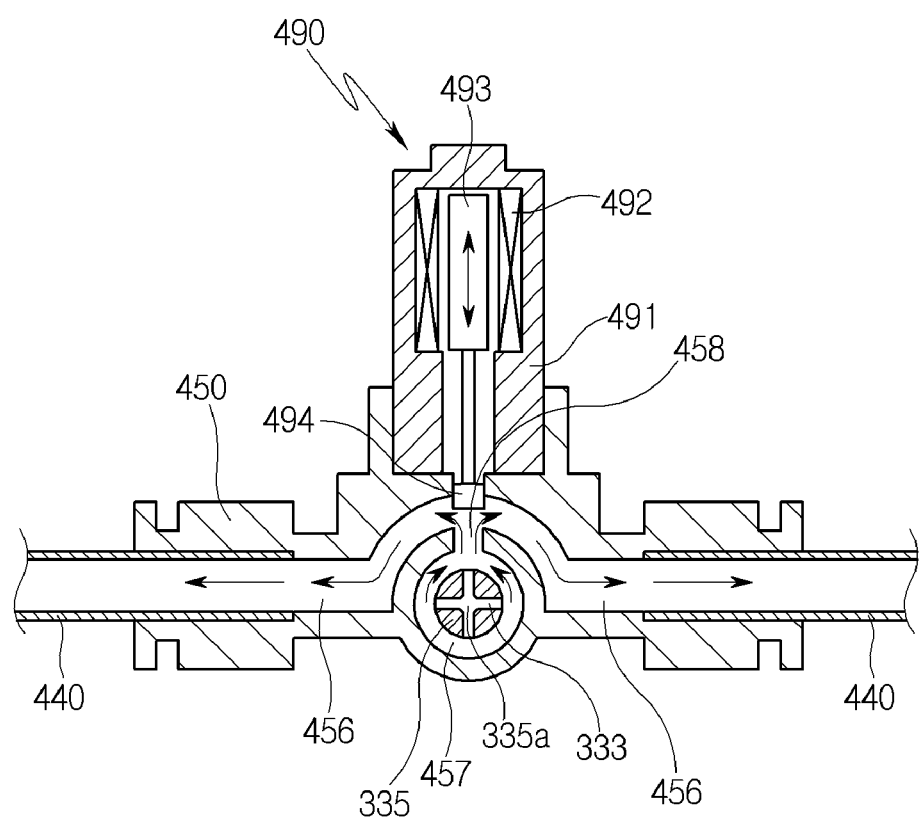
[FIG. 25]

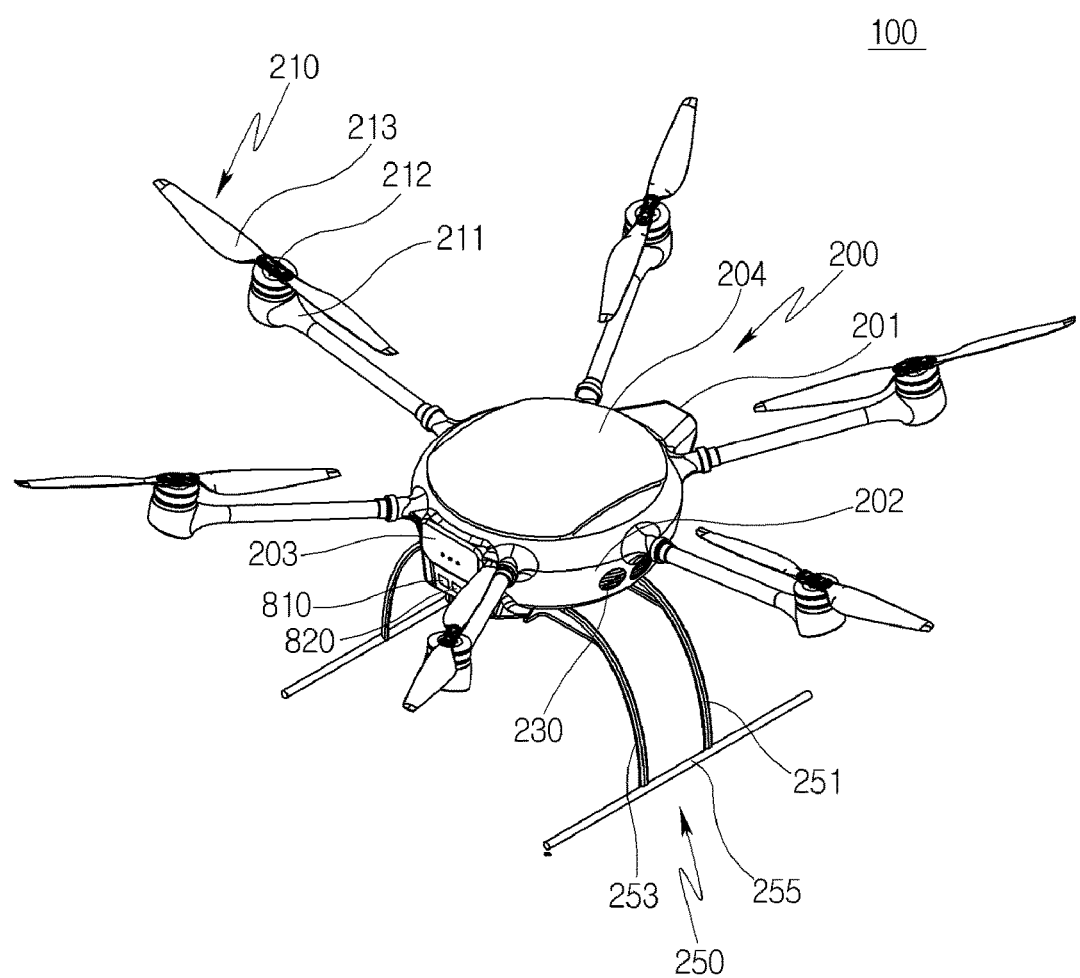
[FIG. 26]

[FIG. 27]
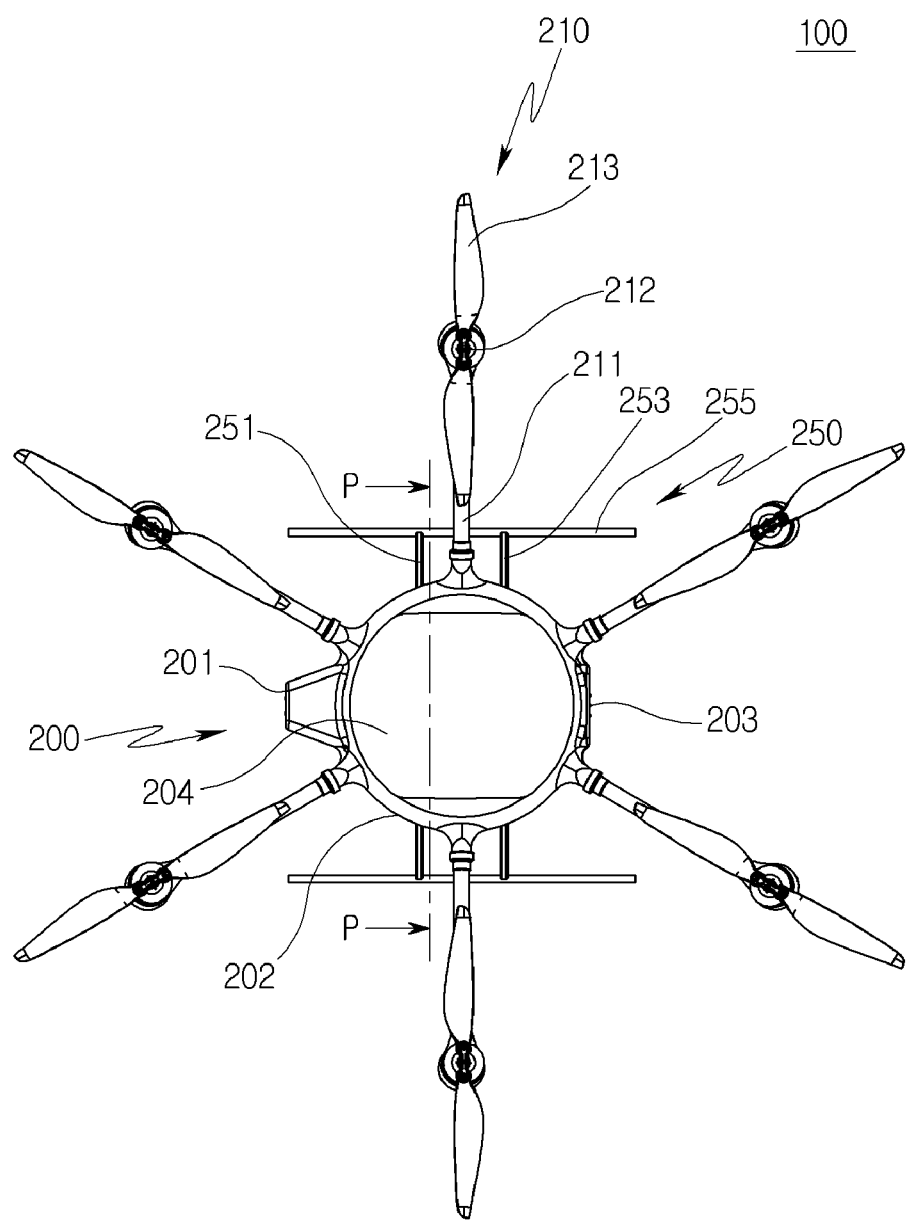

[FIG. 28]
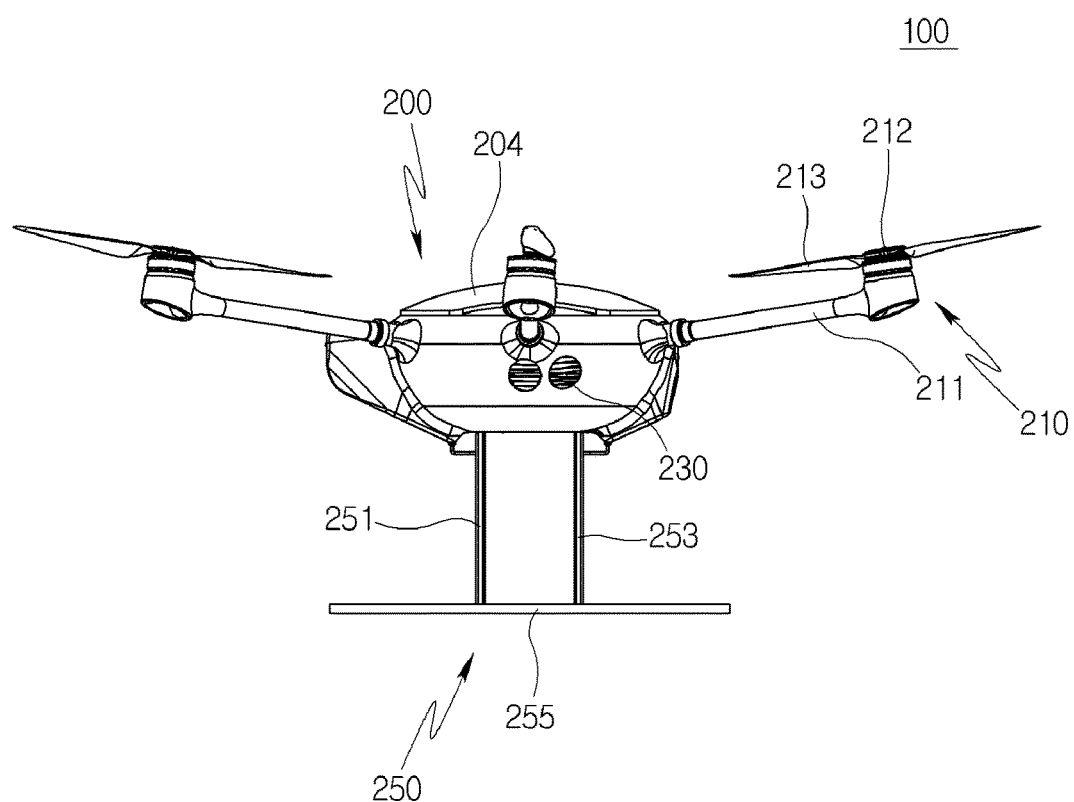

[FIG. 29]
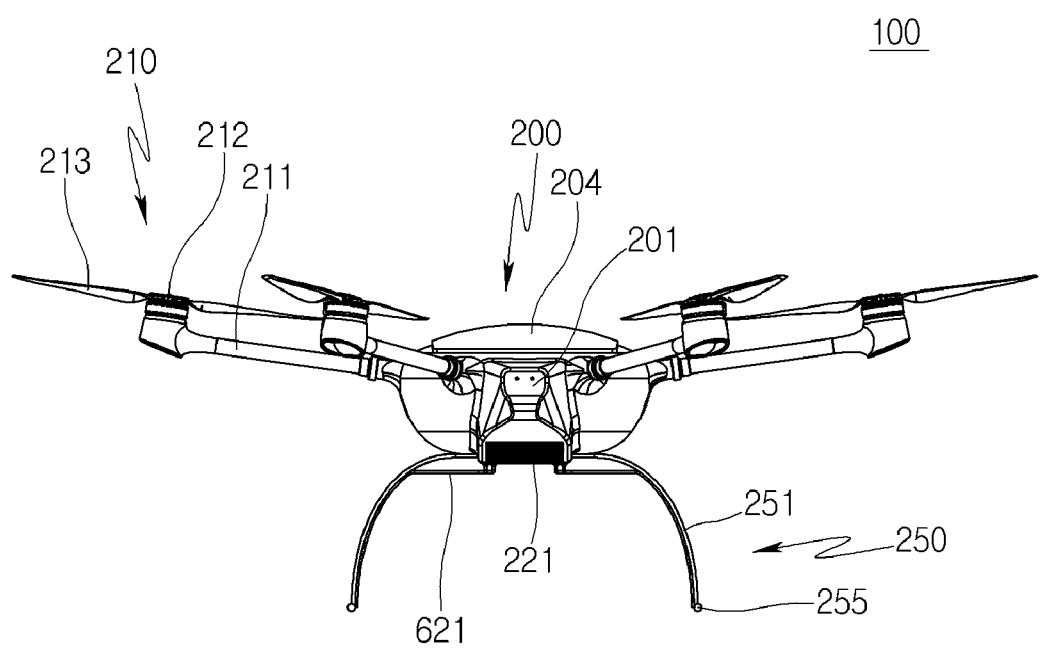

[FIG. 30]
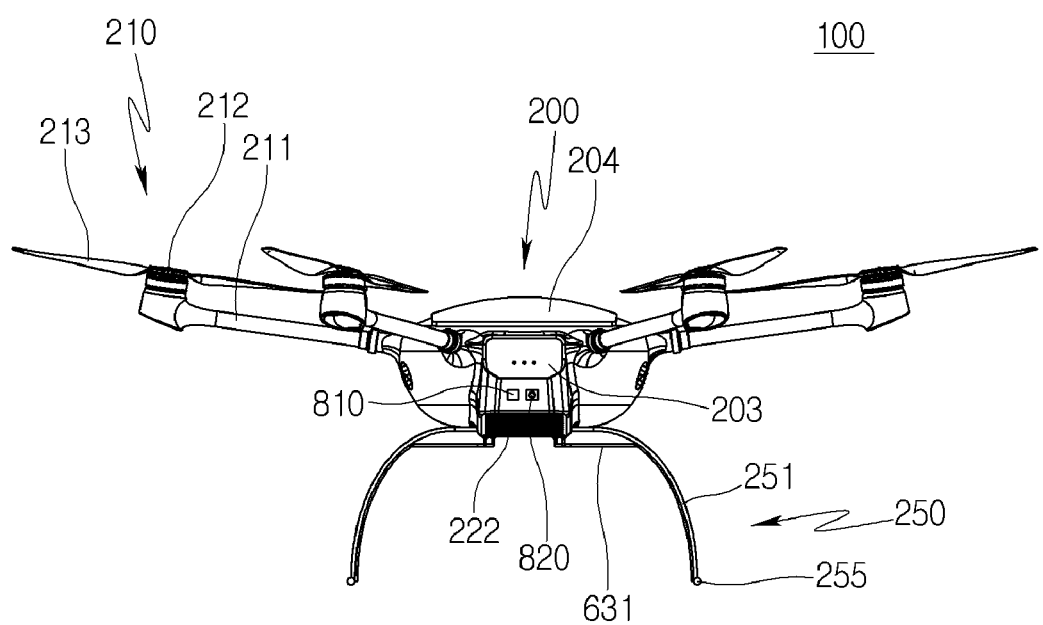

【FIG. 31】
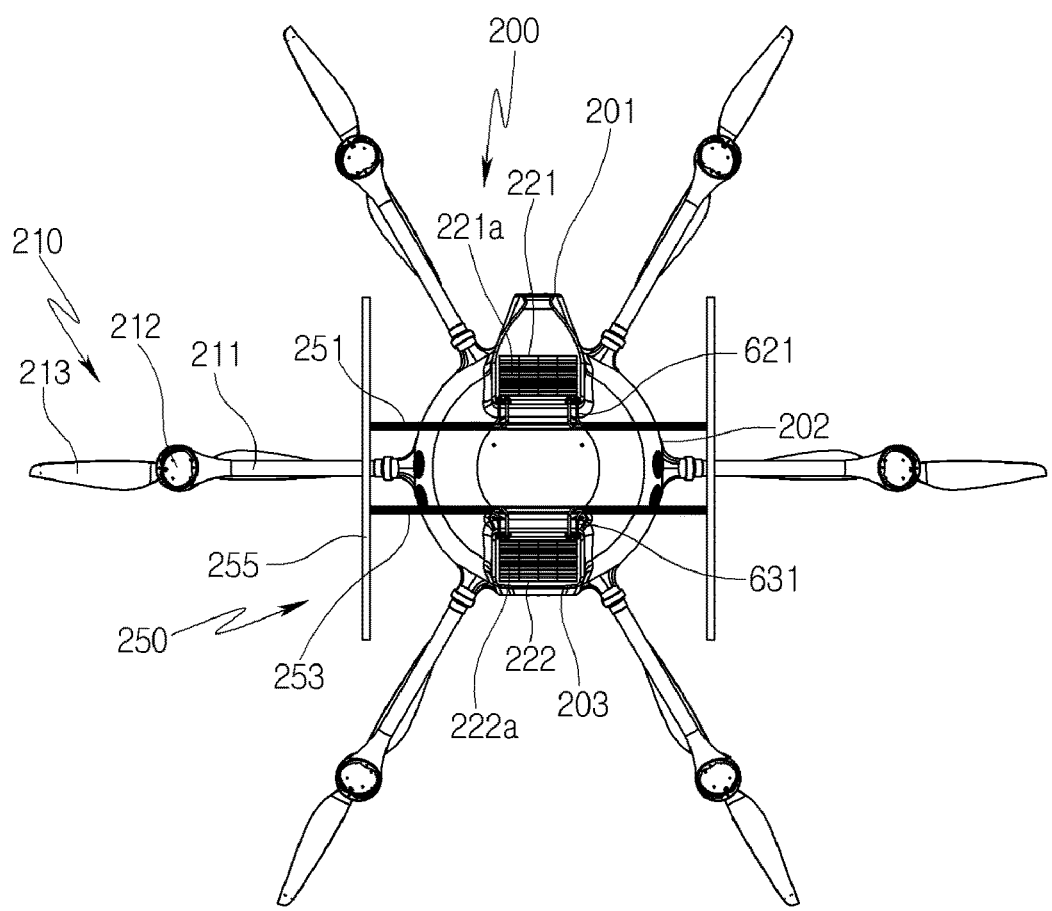

FUEL CELL POWER PACK-INTEGRATED DRONE

CROSS REFERENCE TO RELATED APPLICATIONS

This application is a National Stage of International Application No. PCT/KR2019/011021 filed Aug. 28, 2019, claiming priority based on Korean Patent Application No. 10-2018-0103816 filed Aug. 31, 2018.

TECHNICAL FIELD

Apparatuses and methods consistent with exemplary embodiments relate to a drone equipped with fuel cell power pack, and more particularly, to a drone having a fuel cell power pack integrally equipped therein.

DESCRIPTION OF THE RELATED ART

A drone is a generic term for unmanned aerial vehicle. The drone controlled by radio waves was initially used militarily for intercept practice of air force aircraft, anti-aircraft guns or missiles.

As wireless technology gradually developed, the drone is also used for military reconnaissance aircraft and destroying target facilities equipped with various weapons.

Recently, the use of drones is expanding. Small drones have been developed and used for leisure purposes. In addition, delivery industry is planning and executing a delivery mechanism that uses drones to transport ordered goods.

In line with this trend, major global companies consider the drone-related industry to be a promising new business and are focusing on investment activities and technology development.

However, in the operation of a drone, one of the most important things is whether it can be operated for a long time. Most of the drones currently used in the market do not have long flight times. Drones operate by driving a plurality of propellers, and a lot of power is consumed to drive the propellers.

However, if a drone is equipped with a large-volume, high-capacity battery or a large number of batteries to increase flight time, the size and weight of the drone may increase due to the size and weight of the battery, resulting in inefficient results. In particular, for delivery-related drones, the payload value is also considered, so reducing the size and weight of the drone itself becomes one of the important factors in drone operation. Thus, there is a limit to increasing the volume or number of batteries on the market for long-term operation.

In addition, if a large-volume, high-capacity battery or a large number of batteries is indiscriminately installed on the drone, the drone's mobility may decrease.

SUMMARY

Aspects of one or more exemplary embodiments provide a drone equipped with full cell power pack capable of reducing weight by supplying power from a fuel cell while enabling long-term operation of a drone. Because an overall weight balance of the fuel cell power pack itself can be maintained, even if it is integrally mounted inside the drone, the stable operation of the drone can be achieved. In addition, the improved air circulation structure of the exemplary embodiments can maintain a stable operational environment temperature of a stack while contributing to the generation of the lift force of the drone. In addition, a tilting mounting and removing structure of the exemplary embodiments can enhance the user's convenience to easily attach and detach a gas tank.

Additional aspects will be set forth in part in the description which follows and, in part, will become apparent from the description, or may be learned by practice of the exemplary embodiments.

According to one aspect of an exemplary embodiment, there is provided a drone equipped with fuel cell power pack including: a case including a wing part placed along an outer circumference of the case, a module frame placed in the case, a fuel cell unit placed in the module frame with a weight balance, and a gas tank mounted on the module frame and connected to the fuel cell unit.

The fuel cell unit may include a manifold part placed in the module frame and connected to a regulator valve connected to the gas tank, and a stack part placed in the module frame and connected to the manifold part to receive fuel gas.

The manifold part and the stack part may be arranged in a weight balance with respect to a second direction V2 of the case based on a center line P in a first direction V1 of the case.

The manifold part may be placed in a front portion of the module frame, and a plurality of the stack parts may be placed in positions symmetrical to each other on both sides of the module frame.

The gas tank and the stack part may balance weight with respect to a second direction V2 of the case based on a center line P in a first direction V1 of the case.

A plurality of the stack parts may be placed in the case.

The gas tank and the plurality of stack parts may balance weight with respect to the second direction V2 of the case based on the center line P in the first direction V1 of the case.

The gas tank may be placed on the center line P in the first direction V1 of the case.

The plurality of stack parts may be placed positions symmetrical to each other on both sides of the module frame based on the gas tank.

An auxiliary power supply part may be placed in the case and connected to the fuel cell unit in parallel to supply auxiliary power.

A plurality of auxiliary power supply parts may be placed in positions symmetrical to each other based on a center line P in a first direction V1 of the case.

A plurality of stack parts may be placed in the case, and the plurality of stack parts and the plurality of auxiliary power supply parts may be arranged in a weight balance with respect to a second direction V2 of the case, based on the center line P of the first direction V1 of the case.

A front window inclined in one direction may be placed under the front portion of the case and a rear window inclined in a direction opposite to the front window may be placed under the rear portion of the case.

A discharge part may be formed on an inner lower portion of the case to collect and discharge condensed water discharged from the stack part or condensed water generated by condensing external air inside the case.

The discharge part may include a first drain flow path having a recessed shape and placed in a longitudinal direction of the front window on a lower end of the front window to collect the condensed water condensed in an inner front portion of the case and a second drain flow path having a recessed shape and placed in a longitudinal direction of the rear window on a lower end of the rear window to collect the condensed water condensed in an inner rear portion of the case.

The discharge part may further include a humidification unit placed in the first drain flow path or the second drain flow path to evaporate the condensed water collected in the first drain flow path or the second drain flow path to create a humidification environment in the case.

The humidification unit may be a heat coil, an ultrasonic humidification sensor, or a natural convection humidifier.

A leg part may be placed under the case for take-off and landing of the drone. The leg part may include a first leg having an arch shape and placed in downward direction on a lower portion of the front window, a second leg having an arch shape and placed in downward direction on a lower portion of the rear window, and a seating beam configured to connect ends of the first and second legs.

The discharge part may further include a first drain pipe connected to both ends of the first drain flow path and placed along the first leg, and a second drain pipe connected to both ends of the second drain flow path and placed along the second leg.

Apparatuses consistent with exemplary embodiments relate to a drone driven by a fuel cell power pack that has superior output to weight compared to a related art battery, enable for long operation of the drone and can increase the payload value of the drone.

In addition, a case can be designed in a streamlined manner so that the air resistance that may occur when a drone is maneuvered in various directions can be minimized.

In addition, a hydrogen tank can be placed at the center of the case, and a plurality of stacks can be placed on a position symmetrical to both sides of the hydrogen tank inside the case, so that a weight balance can be achieved and a stable maneuvering operation of a drone can be performed.

In addition, a lid can be placed on the upper surface of the case, and the hydrogen tank can be inserted obliquely into the pressurized manifold block when the lid is opened. In this case, by way of the tilting structure connected to the manifold block, a user can mount the hydrogen tank by inserting the hydrogen tank into the manifold block and then lightly pressing the rear portion of the hydrogen tank downward. When removing the hydrogen tank, the handle on the rear portion of the hydrogen tank can be lifted lightly and the rear portion of the hydrogen tank can be arranged to be lifted upward by the tilting structure. Thus, the user can easily remove the hydrogen tank by holding the handle and pulling the hydrogen tank in an inclined direction.

In addition, because the pressurized manifold block can be provided, when the hydrogen tank is inserted into the case, the regulator valve of the hydrogen tank can be firmly coupled to the manifold block in a pressurized state, so that the leakage between the supplies of the hydrogen gas can be prevented.

In addition, t is possible to control the flow rate of hydrogen gas to be supplied to the stack by placing an electronically controlled flow control valve such as a solenoid valve on the manifold block, which can turn the fuel cell on/off at a desired timing by a user, and t is possible for the fuel cell to stop operating in an emergency situation.

In addition, by the user's simple operation of inserting the regulator valve connected to the hydrogen tank into the manifold block, the opening and closing bar placed inside the regulator valve can be pressed by the push part formed inside the manifold block, so that a structure where gas flow paths are in communication with each other can be formed and work convenience can be improved.

In addition, the gas supply pipe branching from the manifold block can be connected to the top of the stack, and when the condensate generated by the electrochemical reaction of hydrogen gas and air moves downwards by gravity, the inflow of the hydrogen to be supplied from the gas supply pipe to the stack cannot disturbed. Thus, the chemical reaction efficiency in the stack can be increased.

In addition, condensate discharge parts can be placed at the bottom of the front window and the bottom of the rear window formed at the bottom of the case. The condensed water condensed inside the case and the condensed water discharged from the stack part can be collected in the discharge part and discharged to an outside. This can allow the interior of the case to be kept in a relatively clean state, and prevent control devices such as circuit boards from being exposed to condensate. Alternatively, the control device can be insulated or waterproof. In this case, the drain pipe of the discharge part can be placed so as to flow along the leg part placed at the bottom of the case, so that indiscriminate discharge of condensed water can be prevented.

In addition, an auxiliary battery such as a lithium-ion battery can be placed and controlled to supply power in parallel with the fuel cell, thereby enabling stable power supply to the drone. In this case, in consideration of the weight balance, a plurality of auxiliary batteries can be placed in positions symmetrical to each other on both sides of the case with the hydrogen tank as a center, and even if one auxiliary battery fails, the remaining auxiliary batteries enable stable operation of the drone.

In addition, an air inlet can be placed at the bottoms of the front and rear portions of the case, an air outlet can be placed on both sides of the case, respectively, and a fan can be placed on the air outlet. Thus, as the fan is driven, the air introduced through the bottoms of the front and rear portions can pass through the stack. In this case, the inside of the case can be formed in a negative or lower pressure state, so that the supplying of air to be supplied to the stack can be smoothly performed. The controller for controlling the fuel cell can adjust the flow rate of air to be supplied to the stack by controlling the rotational speed of the fan motor, thereby enabling efficient operation of the fuel cell according to the operational environment and conditions.

In addition, the circuit board can be placed on the air inlet so that the circuit board heated during operation can be naturally cooled by external air, thereby improving the cooling effect of the circuit board.

In addition, a sealing housing can be provided between the stack and the air outlet and a recirculation flow path can be formed on the sealing housing, so that part of the air that has passed through the stack can be recirculated to the inside of the case through the recirculation flow path, thereby preventing sudden changes in operational environment temperature of the stack according to an outside temperature. In this case, by arranging a valve capable of electronic control on the recirculation flow path so that the amount of recirculated air can be controlled, the internal temperature of the case can maintain the optimized temperature of the fuel cell.

In addition, a plurality of blinds can be placed on the air outlet, and each blind can be arranged in an inclined or curved downward direction so that it can be relatively coincident with the air flow direction by the propeller of the drone. Accordingly, such configuration can contribute in generating the lift force of the drone and prevent rainwater or moisture from entering the system even in snowy and rainy environments.

In addition, a handle can be placed on the hydrogen tank to facilitate handling of the hydrogen tank, and a lid can be placed on the upper portion of the case to facilitate internal operation during maintenance/repair, thereby improving user convenience.

In addition, the drone equipped with fuel cell power pack according to the exemplary embodiment can partially adopt materials such as reinforced plastic, carbon, titanium, aluminum, etc., so that effects such as weight reduction, improved payload value, and reduced power consumption can be achieved.

BRIEF DESCRIPTION OF DRAWINGS

The above and/or other aspects and features will become more apparent from the following detailed description of the exemplary embodiments, taken in conjunction with the accompanying drawings, in which:

FIG. 1 is a perspective view of a drone equipped with fuel cell power pack according to an exemplary embodiment;

FIG. 2 is a plan view of a drone equipped with fuel cell power pack according to an exemplary embodiment;

FIG. 3 is a side view of a drone equipped with fuel cell power pack according to an exemplary embodiment;

FIG. 4 is a front view of a drone equipped with fuel cell power pack according to an exemplary embodiment;

FIG. 5 is a rear view of a drone equipped with fuel cell power pack according to an exemplary embodiment;

FIG. 6 is a bottom view of a drone equipped with fuel cell power pack according to an exemplary embodiment;

FIG. 7 is a plan view illustrating an inside of a drone equipped with fuel cell power pack in a state in which a lid is opened, according to an exemplary embodiment;

FIG. 8 is a plan view illustrating an internal structure of a drone equipped with fuel cell power pack according to an exemplary embodiment;

FIG. 9 is a side view illustrating an internal structure of a drone equipped with fuel cell power pack according to an exemplary embodiment;

FIG. 10 is a front view illustrating an internal structure of a drone equipped with fuel cell power pack according to an exemplary embodiment;

FIG. 11 is a rear view illustrating an internal structure of a drone equipped with fuel cell power pack according to an exemplary embodiment;

FIG. 12 is a bottom view illustrating an internal structure of a drone equipped with fuel cell power pack according to an exemplary embodiment;

FIG. 13 is a rear perspective view illustrating an internal structure of a drone equipped with fuel cell power pack according to an exemplary embodiment;

FIG. 14 is a front perspective view illustrating an inside of a drone equipped with fuel cell power pack according to an exemplary embodiment;

FIG. 15 is a schematic cross-sectional view of a discharge part according to a first exemplary embodiment of;

FIG. 16 is a schematic cross-sectional view of a discharge part according to a second exemplary embodiment;

FIG. 17 is a plan view illustrating an air circulation control structure in a drone equipped with fuel cell power pack according to an exemplary embodiment;

FIG. 18a is a cross-sectional view of P-P shown in FIG. 27;

FIG. 18b is an enlarged view of a portion M shown in FIG. 18a;

FIG. 19a is a cross-sectional view of B-B shown in FIG. 2;

FIG. 19b is an enlarged view of a portion L shown in FIG. 19a;

FIG. 20 is a plan view illustrating a gas tank mounting and removing tilting and gas supply structure in a drone equipped with fuel cell power pack according to an exemplary embodiment;

FIG. 21 is an enlarged view of a portion N shown in FIG. 20;

FIG. 22 is a perspective view of a structure of a pressurizing unit according to an exemplary embodiment;

FIG. 23 is a cross-sectional view of a structure of a gas supply unit according to an exemplary embodiment;

FIG. 24 is an enlarged view of a portion H shown in FIG. 23;

FIG. 25 is a cross-sectional view illustrating an arrangement structure of a flow control valve according to an exemplary embodiment;

FIG. 26 is a perspective view of a drone equipped with fuel cell power pack according to another exemplary embodiment;

FIG. 27 is a plan view of a drone equipped with fuel cell power pack according to another exemplary embodiment;

FIG. 28 is a side view of a drone equipped with fuel cell power pack according to another exemplary embodiment;

FIG. 29 is a front view of a drone equipped with fuel cell power pack according to another exemplary embodiment;

FIG. 30 is a rear view of a drone equipped with fuel cell power pack according to another exemplary embodiment; and FIG. 31 is a bottom view of a drone equipped with fuel cell power pack according to another exemplary embodiment.

DETAILED DESCRIPTION

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Hereinafter, a drone equipped with a fuel cell power pack according to the exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a perspective view of a drone equipped with fuel cell power pack according to an exemplary embodiment, FIG. 2 is a plan view of a drone equipped with fuel cell power pack according to an exemplary embodiment, FIG. 3 is a side view of a drone equipped with fuel cell power pack according to an exemplary embodiment, FIG. 4 is a front view of a drone equipped with fuel cell power pack according to an exemplary embodiment, FIG. 5 is a rear view of a drone equipped with fuel cell power pack according to an exemplary embodiment, FIG. 6 is a bottom view of a drone equipped with fuel cell power pack according to an exemplary embodiment, FIG. 7 is a plan view illustrating an inside of a drone equipped with fuel cell power pack with a lid open according to an exemplary embodiment, FIG. 8 is a plan view illustrating an internal structure of a drone equipped with fuel cell power pack in a state in which a lid is opened according to an exemplary embodiment, FIG. 9 is a side view illustrating an internal structure of a drone equipped with fuel cell power pack according to an exemplary embodiment, FIG. 10 is a front view illustrating an internal structure of a drone equipped with fuel cell power pack according to an exemplary embodiment, FIG. 11 is a rear view illustrating an internal structure of a drone equipped with fuel cell power pack according to an exemplary embodiment, FIG. 12 is a bottom view illustrating an internal structure of a drone equipped with fuel cell power pack according to an exemplary embodiment, FIG. 13 is a rear perspective view illustrating an internal structure of a drone equipped with fuel cell power pack according to an exemplary embodiment, and FIG. 14 is a front perspective view illustrating an inside of a drone equipped with fuel cell power pack according to an exemplary embodiment, Referring to FIGS. 1 to 14, a drone equipped with fuel cell power pack 100 according to an exemplary embodiment may include a case 200, a module frame 900, a gas tank 300, and a fuel cell unit 400. In the drone equipped with fuel cell power pack 100, the fuel cell power pack may be a device that is integrally mounted in a flying object such as a drone to supply power. Therefore, the fuel cell power pack can be mounted on a drone and configured with an optimal design for flying.

An outer shape of the case 200 may be a flying object such as a drone. Thus, a wing part 210 may be placed along an outer circumference of the case 200. The wing part 210 may include a wing beam 211, a driving motor 212, and a propeller 213.

A plurality of the wing beams 211 may be placed with a predetermined interval along the outer circumference of the case 200 and be implemented in a form protruding outward of the case 200. The driving motor 212 may be placed at an end of the wing beam 211, and the propeller 213 may be connected to a rotational shaft of the driving motor 212. The driving motor 212 may receive power from the fuel cell unit 400 to rotate the propeller 213.

Here, an overall appearance of the case 200 and the wing part 210 may have a streamlined shape to minimize air resistance during maneuvering.

As shown in FIG. 1, the outer appearance of the case 200 may be determined in a shape corresponding to an arrangement structure of the fuel cell unit 400 placed inside the case 200. Even at this time, each corner can be structured into a smooth streamlined shape to reduce air resistance. Alternatively, as shown in FIG. 26, it may be adopted as a round-shaped case 200 that can minimize air resistance in all directions during maneuvering.

The case 200 may be made of a material such as reinforced plastic, carbon, titanium, or aluminum for lightweight.

A lid 204 may be placed on the case 200. A lid handle for opening and closing the lid 204 may be placed on the lid 204. A user may hold the lid handle and open the lid 204 in managing and repairing various components placed inside the case 200.

Meanwhile, the user may open the lid 204 to mount and remove the gas tank 300.

A leg part 250 may be placed under the case 200 for take-off and landing of the drone 100. The leg part 250 may include a first leg 251, a second leg 253, and a seating beam 255.

The first leg 251 having an arch shape may be placed on a lower portion of a front window 221 placed on a lower side of a front portion 201 of the case 200, and the second leg 253 having an arch shape may be placed on a lower portion of a rear window 222 placed on a lower side of a rear portion 203 of the case 200. In addition, the seating beam 255 may be configured in a straight line connecting ends of the first and second legs 251 and 253 so that the drone can be stably seated on a ground.

The module frame 900 may be placed in the case 200 and in which the fuel cell unit 400 and the gas tank 300 may be mounted.

The gas tank 300 may be mounted on the module frame 900 and connected to the fuel cell unit 400 to supply fuel gas.

Referring to FIGS. 8 to 12, a tank handle 301 may be placed at a rear end of the gas tank 300 so that a user can easily handle the gas tank 300. Here, the tank handle 301 may be formed in a disk shape and have a plurality of holes that can be held by a user's finger.

A tank fixing bar 241 may be placed in the rear portion 203 of the case 200. The tank fixing bar 241 may be configured to have a grip part 242 in a shape of a forceps so that the tank handle 301 can be fitted thereto. When a user grabs and lowers the tank handle 301 downward, the tank handle 301 can be fitted and fixed to the grip part 242 of the tank fixing bar 241.

The gas charged in the gas tank 300 may be hydrogen gas.

Referring to FIGS. 5 and 26, a power switch 820 for operating the fuel cell unit 400 placed in the case 200 may be placed on the rear portion 203 of the case 200. A user can simply click the power switch 820 to operate the drone equipped with the fuel cell power pack 100.

In addition, a fuel condition displaying window 810 may be connected to the gas tank 300 and display a remaining amount of gas in the gas tank 300. A user can determine the remaining amount of gas by recognizing a color of the fuel condition displaying window 810. The fuel condition displaying window 810 may be in the form of an indicator LED, but is not limited thereto.

For example, if a color is blue or green, the remaining gas is 80-100% which can indicate a sufficient condition, if a color is yellow, the remaining gas is 40-70% which can indicate an intermediate condition, and if a color is red, the remaining gas is 0-30% which can indicate an insufficient condition and requiring of gas filling. Other settings may be possible.

Referring to FIGS. 4 to 6, the front window 221 and the rear window 222 may be placed on the front portion 201 and the rear portion 203 of the case 200, respectively, and the front window 221 and the rear window 222 may be an air inlet 220 through which external air is introduced into the case 200.

The front window 221 may be placed inclined in one direction at a bottom of the front portion 201 of the case 200, and the rear window 222 may be placed inclined in a direction opposite to the front window 221 at a bottom of the rear portion 203 of the case 200.

The inclined arrangement can increase an amount of the air introduced from the front window 221 by the maneuvering speed when a drone is maneuvering in a front direction. On the contrary, it can increase an amount of the air introduced from the rear window 222 by the maneuvering speed when a drone is maneuvering in a rear direction.

Thus, at the front window 221 and the rear window 222, it can proceed the forced air intake that can be formed in a condition of negative pressure or lower pressure environment in the case 200 by an operation of a fan member 730, as well as the natural air intake using maneuvering speed according to the maneuvering direction of a drone.

Here, window blinds 221a and 222a arranged in a plurality of rows may be formed on the front window 221 and the rear window 222, and they can prevent relatively bulky foreign substances from flowing into the case 200.

A filter may be placed on the front window 221 and the rear window 222 to effectively remove foreign substances contained in the air.

In addition, a plurality of the air inlets 220 may be placed on the case 200. It is understood that the location of the air inlet 220 is not limited on the case 200.

Referring to FIG. 3, an air outlet 230 may be placed on a side portion 202 of the case 200 and may have a plurality of blinds 740. The air introduced in the air inlet 220 may proceed the flow circulating the inside of the case 200 and then discharged to an outside through the air outlet 230.

Referring to FIGS. 7 and 8, the fuel cell unit 400 may be placed in a weight balance on the module frame 900 in the case 200. Because the fuel cell power pack is mounted on a flying object such as a drone to fly together, the case 200, the module frame 900, the gas tank 300, and the fuel cell unit 400 can be placed in an overall weight balance so as not to interfere with the drone's mobility.

The fuel cell unit 400 may include a manifold part 420 and a stack part 410. The manifold part 420 may be connected to a regulator valve 320 coupled to the gas tank 300. The stack part 410 may be connected to the manifold part 420 and receive gas from the manifold part 420.

Here, based on a center line P in a first direction V1 of the case 200, the manifold part 420 and the stack part 410 may be placed in a weight balance in a second direction V2 of the case 200.

For example, the manifold part 420 may be placed on a front portion of the module frame 900 in the case 200, and a plurality of the stack parts 410 may be placed on positions symmetrical to each other on both sides of the module frame 900 in the case 200.

If the plurality of stack parts 410 are placed, the gas tank 300 and the plurality of stack parts 410 may be placed in weight balance on the module frame 900 with respect to the second direction V2 of the case 200, that is, both sides, based on the center line P in the first direction V1 of the case 200.

In detail, the gas tank 300 may be placed on the center line P in the first direction V1 of the case 200, and the plurality of stack parts 410 may be placed at the positions symmetrical to each other with respect to the gas tank 300 in both inner sides of the case 200.

Thus, the gas tank 300 may be placed in the inner center of the case 200, that is, in a tank receiving part 910 formed in a center of the module frame 900. The stack part 410 may be configured in two parts, as shown in FIG. 7, and be placed at the same location in the stack receiving part 920 formed on both sides of the module frame 900 based on the gas tank 300, respectively. Accordingly, based on the center line P in the first direction V1, the drone equipped with fuel cell power pack 100 can achieve a weight balance in the second direction V2.

When the fuel cell power pack is mounted integrally with the drone, such arrangement in consideration of the weight balance can minimize the fluctuation of the center of gravity of the drone, thereby reducing the influence on the operation of the drone.

An auxiliary power supply part 500 may be placed on an auxiliary power bracket 510 provided in the case 200, and connected in parallel with the fuel cell unit 400 to supply power to a drone.

Thus, the fuel cell unit 400 and the auxiliary power supply part 500 may be connected in parallel in a control panel 830 to selectively supply power to the drone.

For example, electric power generated by an electrochemical reaction of oxygen and hydrogen in the stack part 410 of the fuel cell unit 400 may be supplied to a drone to operate the drone.

If an output higher than the output amount produced by the stack part 410 is required according to the flight and mission environment of the drone, the output amount corresponding to insufficient output amount may be supplied in parallel from the auxiliary power supply part 500.

In other situations, for example, when an accidental situation in which power production is stopped due to damage of the stack part 410 occurs, the auxiliary power supply part 500 may supply emergency power to prevent the operation of the drone from stopping during flight.

If a plurality of auxiliary power supply parts 500 are arranged, they may be placed in the positions symmetrical to each other on the front portion 201 of the case 200, based on the center line P of the first direction V1 of the case 200, so as to balance the weight and not to interfere with the movement of the flying object.

For example, the auxiliary power supply part 500 may be configured in multiple parts, and in this case, the stack part 410 of the fuel cell unit 400 may also be configured in multiple parts. The plurality of stack parts 410 and the plurality of auxiliary power supply parts 500 may be arranged in a weight balance in positions symmetrical to each other in the case 200 with respect to the center line P in the first direction V1 of the case 200.

In one exemplary embodiment, each of the stack part 410 and the auxiliary power supply part 500 may be configured in two parts, and they may be arranged in a weight balance in the positions symmetrical to each other in the case 200 based on the center line P in the first direction V1.

Meanwhile, the gas tank 300, the manifold part 420, and the control panel 830 may be placed on the center line P in the first direction V1. They may be arranged to balance weight between the front portion 201 of the case 200 and the rear portion 203 of the case 200 along the center line P in the first direction V1.

That is, the stack part 410 and the auxiliary power supply part 500 may be placed in positions symmetrical to each other on both sides of the center line P of the first direction V1 in the case 200 to achieve a weight balance. The gas tank 300, the manifold part 420, and the control panel 830 may be located on the center line P in the first direction V1 in the case 200, so that the front portion 201 and the rear portion 203 of the case 200 may be placed in a weight balance.

The stack part 410, the auxiliary power supply part 500, the gas tank 300, the manifold part 420, and the control panel 830 can be placed in a weight balance for both directions V1 and V2 inside the case 200. Thus, even if the fuel cell power pack is mounted on the drone, the weight balance of the drone can also be maintained without being shifted to either side.

The weight balance arrangement of the above-described components can minimize the influence on the drone's maneuvering environment and contribute to the smooth maneuvering of the drone.

FIG. 15 is a schematic cross-sectional view of a discharge part according to a first exemplary embodiment, and FIG. 16 is a schematic cross-sectional view of a discharge part according to a second exemplary embodiment.

Referring to FIGS. 15 and 16, a discharge part 600 may be formed in an inner lower portion of the case 200, and is configured to discharge condensate generated by condensing water discharged from the stack part 410 or an external air collected in the case 200.

The discharge part 600 may include a first drain flow path 620, a first drain pipe 621, a second drain flow path 630, and a second drain pipe 631.

The first drain flow path 620 may be placed in a recessed shape in the longitudinal direction of the front window 221 at the lower end of the front window 221 to collect the condensed water condensed at the inner front portion of the case 200.

Referring to FIG. 16, the first drain pipe 621 may be connected to the bottom of both ends of the first drain flow path 620 so that the condensed water collected in the first drain flow path 620 can be discharged to the lower portion of a drone.

Referring to FIGS. 29 to 31, the first drain pipe 621 can be connected to the bottom of the first drain flow path 620 and may be placed in an arch shape along the first leg 251.

The condensed water collected in the first drain flow path 620 may move to the seating beam 255 along the first drain pipe 621 and then be discharged to an outside.

In addition, the second drain flow path 630 may be placed in a recessed shape in the longitudinal direction of the rear window 222 at the bottom side of the rear window 222 to collect the condensed water condensed at the inner rear portion of the case 200.

Referring back to FIG. 16, the second drain pipe 631 may be connected to the bottom side of both ends of the second drain flow path 630 so that the condensed water collected in the second drain flow path 630 can be discharged to the lower portion of a drone.

Further, in another exemplary embodiment as illustrated in FIGS. 29 to 31, the second drain pipe 631 may be connected to the bottom of the second drain flow path 630 and may be placed in an arch shape along the second leg 253.

The condensed water collected in the second drain flow path 630 may move to the seating beam 255 along the second drain pipe 631, and then be discharged to an outside.

In another exemplary embodiment, the first and second drain pipes 621 and 631 may be arranged along the leg part 250 to prevent condensed water from being indiscriminately discharged from the lower portion of a drone.

Referring back to FIGS. 15 and 16, the discharge part 600 may be placed in the first drain flow path 620 and/or the second drain flow path 630, and evaporate the condensed water collected in the first and second drain flow paths 620 and 630. Thus, a humidification unit 640 may be further provided to create a humidification environment in the case 200.

In general, an electrochemical reaction between oxygen and hydrogen in a fuel cell stack is more promoted in a humidification environment than in a dry environment, thereby increasing power generation efficiency of the fuel cell.

Therefore, the humidification unit 640 can be placed in the first and second drain flow paths 620 and 630 and create a humidification environment in which an electrochemical reaction can be accelerated in the stack part 410 by evaporating the collected condensed water again, thereby contributing to increase the power generation efficiency of the stack part 410.

As illustrated in FIG. 15a, the humidification unit 640 may be configured in the form of a heat coil. The heat coil may be placed on the first and second drain flow paths 620 and 630 and the condensed water collected in the first and second drain flow paths 620 and 630 may receive heat from the heat coil and evaporate to create humidification environment. In this case, the control panel 830 may control the heat coil, and the heat coil may receive power from the stack part 410 or the auxiliary power supply part 500.

Alternatively, as illustrated in FIG. 16, the humidification unit 640 may be an ultrasonic humidification sensor. The ultrasonic humidification sensor may be placed on the first and second drain flow paths 620 and 630, and the condensed water collected in the first and second drain flow paths 620 and 630 may become steam by the vibration generated by ultrasonic waves, and create humidification environment in the case 200. The control panel 830 may control the ultrasonic humidification sensor, and the ultrasonic humidification sensor may receive power from the stack part 410 or the auxiliary power supply part 500.

It is understood that these are only examples, and are not limited thereto and may also be implemented as other humidification unit 640 such as a natural convection humidifier.

FIG. 17 is a plan view illustrating an air circulation control structure in a drone equipped with fuel cell power pack according to an exemplary embodiment, FIG. 18a is a cross-sectional view of P-P shown in FIG. 17, FIG. 18b is an enlarged view of a portion M shown in FIG. 18a, FIG. 19a is a cross-sectional view of B-B shown in FIG. 2, and FIG. 19b is an enlarged view of a portion L shown in FIG. 19a.

Referring to FIGS. 6, 17, 18a and 18b, an air circulation control structure of the drone equipped with fuel cell power pack 100 may include the air inlet 220, the air outlet 230, and an air circulation control unit 700. The air inlet 220, the air outlet 230 and the air circulation control unit 700 may be placed in the case 200 of the drone equipped with fuel cell power pack 100.

The air inlet 220 may be placed under the front portion 201 or the rear portion 203 of the case 200 and may be a component through which external air is introduced. Here, the front window 221 having a plurality of window blinds 221a placed on the front portion 201 of the case 200 and the rear window 222 having a plurality of window blinds 222a placed on the rear portion 203 may be the air inlet 220. However, the location of the air inlet 220 is not limited within the case 200.

In this case, the control panel 830 may be placed on the upper side of the front window 221 in the case 200, and may be configured to be cooled by the air introduced from the front window 221. That is, when the fuel cell is operated, the circuit placed in the control panel 830 can be heated, and at this time, it can be cooled by the air flow introduced from an outside. It is understood that the location of the control panel 830 is not limited to the upper side of the front window 221.

The air outlet 230 may be placed to be spaced apart from the air inlet 220 in the case 200 and may be a component through which the air introduced into the case 200 is discharged. In this case, the air outlet 230 may be placed adjacent to the stack part 410.

Here, the module frame 900 may be placed in the case 200. The tank receiving part 910 may be formed at a center side of the module frame 900 and the gas tank 300 may be placed. Further, the stack receiving part 920 may be formed on both sides of the module frame 900 and a plurality of the stack parts 410 may be placed. Accordingly, the air outlet 230 may be placed on the side portion 202 of the case 200 while adjacent to the stack part 410.

The air flow may be introduced from the air inlet 220, pass through the stack part 410, be guided by the air circulation control unit 700 and be discharged to the air outlet 230.

The air circulation control unit 700 may be placed in connection with the stack part 410 and the air outlet 230 to control the air flow that passes through the stack part 410 and flows in the direction of the air outlet 230 in the case 200.

The air circulation control unit 700 may include a sealing housing 710, a fan member 730, a recirculation flow path 720, and a blind 740.

The sealing housing 710 may be placed to seal the circumference of one surface of the stack part 410 and the outer circumference of a duct 760 placed at the air outlet 230 so that the air passing through the stack part 410 flows in the direction of the air outlet 230.

The sealing housing 710 may be configured to have a plurality of plates. The plurality of plates may surround the circumference of one surface of the stack part 410, and one plate may be connected to the outer circumference of the duct 760 to form a sealed space.

Due to the sealed space, the air passing through the stack part 410 can flow only in the direction of the duct 760 of the air outlet 230.

Here, a fixing panel 713 may be provided to fix the position of the sealing housing 710 inside the case 200. The fixing panel 713 may be placed to connect and fix the side portion of the case 200 and the sealing housing 710.

The fixing panel 713 may be provided with an opening window 713a having a square cross-sectional shape connecting one surface of the stack part 410 and one surface of the sealing housing 710. In addition, a sealing unit 714 may be placed along a circumference of the opening window 713a in a direction facing the stack part 410.

The sealing unit 714 may be in close contact with the circumference of one surface of the stack part 410 and allow the air passing through the stack part 410 to flow in the direction of the sealing housing 710 without leakage.

The fan member 730 may be connected and placed to the duct 760 of the air outlet 230. When the fan member 730 operates, the air in the case 200 can be discharged to an outside through the air outlet 230, so that relatively negative or lower pressure compared to an external environment can be formed in the case 200.

When the inside of the case 200 becomes negative or low pressure, an external air can be introduced into the case 200 through the air inlet 220 due to a pressure difference. That is, an air circulation environment can be created forcibly by operating the fan member 730 in the case 200.

Here, the fan member 730 may be placed in the space formed by the duct 760 of the air outlet 230, the sealing housing 710 and the stack part 410, so that the air discharge due to the operation of the fan member 730 can adjust the air flow environment in which the air introduced through the air inlet 220 is forcibly passed through the stack part 410.

A user can control a rotational speed of the fan member 730 with a controller and control the amount of air introduced into the case 200 due to the pressure difference. This can result in adjusting the amount of air supplied to the stack part 410, which may be used for controlling the output of the stack part 410.

The fan member 730 may include a fan bush 731, a driving motor 733 and a fan blade 735. The fan bush 731 may be provided in a cylindrical shape, and may be connected and placed around the inner circumference of the duct 760 of the air outlet 230. The driving motor 733 may be placed at a central portion of the fan bush 731. The fan blade 735 may be connected to the rotational shaft of the driving motor 733.

Meanwhile, in order for the fuel cell to operate stably while maintaining high efficiency, it may need to maintain the optimal operation environment of the fuel cell stack. In particular, the operation environment temperature is an important factor, and the operation environment temperature of the fuel cell stack may be affected by the external environment temperature in which the drone is operated.

For example, when a drone is maneuvered in a cold region such as Siberia, Arctic, Antarctic, etc., a temperature difference between the outside and the inside of the case 200 is severe, and the internal temperature of the case 200 decreases due to the outside temperature.

That is, the operation environment temperature of the stack part 410 placed inside the case 200 may not be maintained at an appropriate temperature. In this case, it is necessary to raise the internal temperature of the case 200 to the appropriate temperature.

Conversely, when a drone is maneuvered in a hot region such as Africa, the Middle East, a desert, etc., the temperature difference between the outside and the inside of the case 200 is severe, and the inside temperature of the case 200 is heated by the outside temperature.

That is, the operation environment temperature of the stack part 410 placed inside the case 200 may not be maintained at an appropriate temperature. In this case, it is necessary to lower the internal temperature of the case 200 to the appropriate temperature.

Therefore, in order to prevent the operation environment temperature of the stack part 410 from rapidly changing due to the external environment temperature at which the drone is operated, as shown in FIGS. 17 and 18a, a recirculation flow path 720 can be provided on the sealing housing 710.

After passing through the stack part 410, some of the air remaining in the sealing housing 710 can pass through the recirculation flow path 720 and be diverted to the inside of the case 200 to be recycled.

The air passing through the stack part 410 is the air after cooling the stack part 410, which is an air-cooled type, and maintains a temperature relatively similar to that of the stack part 410. Thus, when some of the remaining air in the sealing housing 710 is recycled in the case 200, the internal temperature of the case 200 may be formed to be similar to the operation environment temperature of the stack part 410.

This can raise the internal temperature of the case 200 to the operation environment temperature of the stack part 410 when the drone is maneuvered in a cold area, and when the drone is maneuvered in a hot area, the internal temperature of the case 200 can be lowered to the operation environment temperature of the stack part 410.

That is, by adjusting the internal temperature of the case 200 to the operation environment temperature of the stack part 410, the operating efficiency of the stack part 410 can be increased.

The air circulation control unit 700 may further include a recirculation control mechanism 722. The recirculation control mechanism 722 may be placed in the recirculation flow path 720 to control a flow rate of recirculated air.

The recirculation control mechanism 722 may be a slide type on/off valve or a butterfly type on/off valve using electronic control, but is not limited thereto.

A user may control a degree of opening and closing of the recirculation control mechanism 722 using a controller.

If the outside air temperature is similar to the operation environment temperature of the stack part 410 and the separate internal temperature control of the case 200 is not required, the user can close the recirculation control mechanism 722 to discharge all the remaining air in the sealing housing 710 to the outside through the air outlet 230.

In this case, the blind 740 may be arranged to be inclined or curved downward and contribute in generating of the lift force of a flying object when all the air in the sealing housing 710 is discharged to the air outlet 230.

If the difference between the outside temperature and the operation environment temperature of the stack part 410 is large, and it is necessary to quickly adjust the internal temperature of the case 200 to the operation environment temperature of the stack part 410, the user may use the controller to completely open the recirculation control mechanism 722.

In this case, because a large amount of air is guided from the sealing housing 710 to the case 200, the internal temperature of the case 200 can be quickly adjusted to the operation environment temperature of the stack part 410.

Referring to FIGS. 18a and 18b, the blind 740 may be placed in the duct 760 of the air outlet 230 to guide the flow direction of the discharged air.

The air circulation control structure of the drone equipped with fuel cell power pack 100 can be designed to make the flow contributing in the generation of the lift force of the drone when the air introduced from the air inlet 220 circulates inside the case 200 and then is discharged to the air outlet 230.

Thus, the stack part 410 may be placed inclined downward within a range of a predetermined angle α1 on the stack receiving part 920 of the module frame 900.

In addition, the sealing housing 710 may be connected and placed inclined downward within a range of a predetermined angle α2 on one surface of the stack part 410.

The fan member 730 may be placed inclined downward within a range of a predetermined angle α3 on the air outlet 230.

In addition, the blind 740 may be placed to be inclined or curved downward so that the air discharged from the air outlet 230 can flow downward.

For example, the stack receiving part 920 of the module frame 900 may be provided in a downwardly inclined form within a range of a predetermined angle α1 with respect to a vertical direction H1, and the stack part 410 may be placed obliquely to the stack receiving part 920.

In this case, the inclination angle α1 of the stack part 410 may be in a range of 5° to 15°, and for example, an inclination angle of around 5° may be adopted.

As the stack part 410 is placed in an inclined manner, the air passing through the stack part 410 and flowing into the sealing housing 710 can be induced to flow downward.

Meanwhile, the opening window 713a of the fixing panel 713 may be in close contact with one surface of the stack part 410 by the sealing unit 714. Here, the stack part 410 may be placed to be inclined downward to the stack receiving part 920, so that the fixing panel 713 may also be placed to be inclined downward at an inclination angle α2 corresponding to the stack part 410.

In this case, because the sealing housing 710 may be connected along the circumference of the opening window 713a of the fixing panel 713, it may be arranged to be inclined downward at an angle corresponding to the inclination angle of the stack part 410. Therefore, the range of the inclination angle α2 of the sealing housing 710 may be the same as that of the stack part 410, i.e., within the range of 5° to 15°, and preferably around the range of 5°.

However, it is understood that the sealing housing 710 may be connected to and placed on one surface of the stack part 410 in a further downward direction within a certain angle range.

In this case, the range of the inclination angle α2 of the sealing housing 710 may be larger than the range of the inclination angle of the stack part 410. For example, the arrangement inclination angle of the sealing housing 710 to one surface of the fixing panel 713 may be more inclined within the range of 10° to 20° than the inclination range to the stack part 410.

The air outlet 230 may also be placed to face downward on the side portion of the case 200. Accordingly, the fan member 730 may also be placed to face downward in the same manner as the air outlet 230.

Here, because the fan member 730 may be connected to the sealing housing 710, the fan member 730 may be placed to be inclined downward at an angle corresponding to the arrangement inclination angle α2 of the sealing housing 710. In this case, the range of the inclination angle α3 of the fan member 730 may be the same as that of the sealing housing 710, i.e., within the range of 5° to 15°, and preferably around the range of 5°.

In another exemplary embodiment, the arrangement inclination angle α3 of the fan member 730 may be larger than the arrangement inclination angle α2 of the sealing housing 710. For example, if the arrangement inclination angle α2 of the sealing housing 710 is in the range of 5° to 15°, the inclination angle α3 of the fan member 730 may be in the range of 10° to 25°.

Alternatively, the arrangement inclination angle α3 of the fan member 730 may be larger than the arrangement inclination angles α1 and α2 of the stack part 410 and the sealing housing 710. For example, if the arrangement inclination angle α1 of the stack part 410 is in the range of 5° to 15° and the inclination angle α2 of the sealing housing 710 that is more inclined than the stack part 410 is in the range of 10° to 20°, the inclination angle α3 of the fan member 730 may be in the range of 15° to 30°.

As described above, when the arrangement inclination angle α3 of the fan member 730 is larger than the arrangement inclination angles α1 and α2 of the stack part 410 and the sealing housing 710, the flow direction of the air that passes through the stack part 410, the sealing housing 710 and the fan member 730 and flows in the direction of the air outlet 230 can be smoothly guided downward.

That is, depending on the direction of air flow, the arrangement inclination angles of the stack part 410, the sealing housing 710 and the fan member 730 may be gradually placed more inclined so that air can flow smoothly in the downward direction.

Meanwhile, the blind 740 may be placed on the air outlet 230 so as to be inclined or curved in a downward direction.

In the drone equipped with fuel cell power pack 100, the propeller 213 may be placed above the air outlet 230. In the case of the propeller 213 driven drone, the drone is lifted by the lift force generated by the rotation of the propeller 213. If the inclined direction or the curvature direction of the blind 740 is set to the downward direction, the flow direction of the air discharged from the air outlet 230 and flowing downward and the external air flowing downward through the propeller 213 of the drone can coincide, contributing to the generation of the lift force of the drone.

Here, in order for the air passing through the blind 740 to contribute to the generation of the lift force of the propeller 213 driven drone, the inclination angles θ11 and θ12 of the blind 740 may be formed between 5° to 80° in the downward direction based on the horizontal direction H2. For example, the inclination angle θ11 may be in a range of 5° to 45°, and the inclination angle θ12 may be in a range of 30° to 80°. Preferably, the inclination angle θ11 may be around 30° and the inclination angle θ12 may be around 60°.

Referring to FIG. 18b, when described in relation to the arrangement inclination angles α1, α2 and α3 of the stack part 410, the stack part 410, the sealing housing 710 and the fan member 730 may have the arrangement inclination angle in the range of 5° to 15°, and preferably around 5°.

As discussed above, the arrangement inclination angles α1, α2 and α3 of the stack part 410, the sealing housing 710 and the fan member 730 can be gradually more inclined according to the air flow direction.

Accordingly, because the air passing through the stack part 410 and flowing in the direction of the blind 740 can be gradually induced to flow downward, the discharge flow of air may smoothly proceed in a direction for contributing to the generation of the lift force.

Here, a plurality of the blinds 740 may be placed on the duct 760 of the air outlet 230, and lengths of the plurality of blinds 740 may be decreased as the blinds are arranged from the upper side to the lower side of the air outlet 230.

Here, the air outlet 230 is formed to be inclined or curved toward the inside of the case 200 from the upper side to lower side on the case 200.

In this case, the length of the blind 740 can be formed to be reduced as it goes from the upper side to the lower side of the air outlet 230, so that the discharging air can also flow downward.

Here, the length of the blind 740 may be reduced by a certain ratio, which may correspond to a ratio angle θ2 that decreases from the upper side to the lower side of the air outlet 230.

As the length of the blinds 740 is reduced by the certain ratio, the air passing through the blinds 740 arranged in a plurality of rows may exhibit a relatively uniform flow.

Because the air flows downward, the length of the lower blind 742 placed at the lower side may be shorter than that of the upper blind 741 placed at the upper side, so that the downward flow cannot be disturbed.

If the length reduction of the blinds 740 is not constant and is different from each other, one lower blind 742 has a longer length than that of the upper blind 741 placed thereon, the lower blind 742 placed under the upper blind 741 may act as an obstacle to the downward flow of the air passed through the upper blind 741, which may be mixed with the air discharged along the lower blind 742. Accordingly, turbulent flow may occur in the periphery of the air outlet 230. This may prevent air from being discharged smoothly, and may rather hinder the drone's maneuvering.

Therefore, it may be desirable to maintain the length reduction of the blind 740 at a constant rate for smooth downward discharge of air and to make a maneuvering environment for the drone, such as the generation of lift force.

That is, as the downward inclination angles θ11 and θ12 of the blind 740 and the length change of the blind 740 according to the predetermined ratio angle θ2 may work together, the discharging air may be strongly discharged downward. This dual configuration can contribute to the drone's maneuvering environment, such as the generation of lift force.

Referring to FIGS. 6, 17, 19a and 19b, in another air circulation control structure of the drone equipped with a fuel cell power pack 100 according to another exemplary embodiment, the blind 740 may be arranged inclined downward on the air outlet 230.

In the drone equipped with fuel cell power pack 100, the propeller 213 may be placed above the air outlet 230. Thus, as the inclined direction of the blind 740 is set downward, the flow directions of the air discharged from the air outlet 230 and flowing downward and the external air passing through the propeller 213 of the drone and flowing downward can coincide, which can also contribute to the generation of the lift force of the drone.

Here, in order for the air passing through the blind 740 to contribute to the lift force of the propeller 213 driven drone, the inclination angle θ3 of the blind 740 may be formed between 5° and 80° in the downward direction based on the horizontal direction H2, preferably around 60°.

Referring to FIG. 19b, when described in connection with the arrangement inclination angles α1, α2 and α3 of the stack part 410, the sealing housing 710 and the fan member 730, the stack part 410, the sealing housing 710 and the fan member 730 may have the arrangement inclination angle in the range of 5° to 15°, and preferably around 5°.

As discussed above, in other exemplary embodiments, the arrangement inclination angles α1, α2 and α3 of the stack part 410, the sealing housing 710 and the fan member 730 can be arranged gradually more inclined according to the air flow direction.

Accordingly, the air passing through the stack part 410 and flowing in the direction of the blind 740 may be gradually induced to flow downward, and thus, the discharge flow of the air can smoothly proceed in the direction for contributing to the generation of the lift force.

Referring to FIG. 17, when a user operates the fan member 730, the air inside the case 200 can escape through the air outlet 230 and the inside of the case 200 can be in a negative or lower pressure state compared to the outside.

Accordingly, an outside air can be introduced through the front window 221 and the rear window 222 due to a pressure difference. Some of the introduced air can cool the control panel 830 placed on the inner upper portion of the front portion 201 of the case 200 and circulate and flow into the case 200.

The air circulating inside the case 200 can pass through one surface of the stack part 410, and generate electric power by the electrochemical reaction with hydrogen in the stack part 410 or air-cool the stack part 410 and flow toward the sealing housing 710.

The air flowing through the sealing housing 710 can pass through the fan member 730 and be discharged to the outside through the air outlet 230.

In this case, because the stack part 410, the sealing housing 710 and the fan member 730 can be all arranged to be inclined downward, the air flow can proceed downward during the flow process. The air passing through the blinds 740 and discharged downward from the air outlet 230 can be combined with the downward air flow by the propeller 213, contributing to the generation of the lift force of the drone.

Meanwhile, in order to maintain the operation environment temperature of the stack part 410 at an appropriate temperature according to the external environment temperature, a user can set the degree of opening and closing of the recirculation control mechanism 722 by a controller and adjust the air flow rate circulating inside the case 200 through the recirculation flow path 720.

Some of the air passing through the recirculation flow path 720 can recirculate inside the case 200, so that a temperature relatively similar to the operation environment temperature of the stack part 410 can be maintained.

This can contribute to increasing the output efficiency of the stack part 410 by properly maintaining the operation environment temperature and humidification condition of the stack part 410, together with the humidification unit 640 described above.

FIG. 20 is a plan view illustrating a gas tank mounting and removing tilting and gas supply structure in a drone equipped with fuel cell power pack according to an exemplary embodiment, FIG. 21 is an enlarged view of a portion N shown in FIG. 20, FIG. 22 is a perspective view of a structure of pressurizing unit according to an exemplary embodiment, FIG. 23 is a cross-sectional view of a structure of a gas supply unit according to an exemplary embodiment, FIG. 24 is an enlarged view of a portion H shown in FIG. 23, and FIG. 25 is a cross-sectional view illustrating an arrangement structure of a flow control valve according to an exemplary embodiment.

Referring to FIGS. 20 to 25, the gas tank mounting and removing tilting and gas supply structure of the drone equipped with fuel cell power pack 100 may include a module frame 900, a gas supply unit 430, a pressurizing unit 480 and a tilting unit 470.

The module frame 900 may be equipped with components constituting the fuel cell and may be placed inside the case 200.

The gas supply unit 430 may be inserted into the case 200 in an inclined direction and tilted, and may be connected to the regulator valve 320 of the gas tank 300 mounted on the module frame 900. In addition, it may be placed on the front portion of the module frame 900 to supply gas to the stack part 410 mounted on both sides of the module frame 900.

The pressurizing unit 480 may have one part fixed at the front portion of the module frame 900 and the other part connected to the gas supply unit 430 to pressurize the gas supply unit 430 in the direction of the regulator valve 320.

The pressurizing unit 480 may include a housing block 482, a support plate 485, a pressurizing beam 483 and a pressurizing elastic body 481.

The housing block 482 may be connected to a hinge part 475 between a first bracket plate 941 and a second bracket plate 942 formed to protrude from the front portion of the module frame 900 and arranged to be rotatable.

In detail, a protrusions 482e may be formed on both sides of the housing block 482, and the protrusions 482e may be connected to the first and second bracket plates 941 and 942 by a hinge pin 475a, respectively. In this case, for smooth rotation of the hinge pin 475a, a hinge bush 475b may be placed at the connection portion of the first and second bracket plates 941 and 942.

The housing block 482 may be formed in a cylindrical shape, and through holes 482b and 482c may be formed at both ends of the housing block 482 so that the pressurizing beam 483 may penetrate and be placed. In this case, a housing plate 482f in which the through hole 482b is formed may be fixed to the housing block 482 with a fastening piece 488a. In addition, the upper and lower portions of the housing block 482 can be cut and processed to form an opening 482a for reducing weight.

The support plate 485 may be placed at one end of the manifold block 450 constituting the gas supply unit 430. The support plate 485 can be provided to prevent one surface of the manifold block 450 from being worn or damaged by the elastic force of the pressurizing elastic body 481, and it may be a metal material having rigidity.

The pressurizing beam 483 may be placed while penetrating the inside of the housing block 482 and connected to the support plate 485.

For example, the pressurizing beam 483 may be placed while penetrating the through holes 482b and 482c formed at both ends of the housing block 482, and one end of the pressurizing beam 483 may be connected and fixed to one surface of the support plate 485 with a fastening piece 488b.

In addition, the pressurizing beam 483 may be provided in the form of a cylindrical beam as a whole to prevent the pressurizing beam 483 from being separated from the housing block 482, and a stopper 484 in a disk shape may be fixed and placed on the other end of the pressurizing beam 483 with the fastening piece 488c.

The stopper 484 may have a larger diameter than that of the through hole 482b of the housing block 482. This can prevent the pressurizing beam 483 from passing through the through hole 482b when the pressurizing beam 483 is moved in the direction of the rear portion of the module frame 900, thereby limiting the movement range of the pressurizing beam 483.

The pressurizing elastic body 481 may be placed between the housing block 482 and the support plate 485. For example, the pressurizing elastic body 481 may be placed between the inside of the housing block 482 and the support plate 485 to surround the outer circumference of the pressurizing beam 483.

In another exemplary embodiment, a single or multiple pressurizing elastic body 481 may be placed in radial directions between the inside of the housing block 482 and the support plate 485 along the outer circumference of the pressurizing beam 483. Other types of arrangement are possible.

Here, the center of gravity of the pressurizing beam 483 and the housing block 482 may be placed on the module frame 900 to be positioned on the center line P in the first direction V1 of the case 200. When the pressurizing unit 480 having the pressurizing beam 483 and the housing block 482 is placed at the center side of the front portion 201 of the case 200, the weight balance may be formed in the second direction V2 of the case, thereby minimizing the influence of the arrangement state of the pressurizing unit 480 on the operation of the drone.

In addition, when the regulator valve 320 of the gas tank 300 is inserted into the gas supply unit 430, the pressurizing unit 480 can pressurize the gas supply unit 430 in the direction of the regulator valve 320 so that the regulator valve 320 and the gas supply unit 430 can be tightly coupled to each other.

This can prevent gas leakage by preventing the regulator valve 320 and the gas supply unit 430 from being separated during the gas supply process.

The tilting unit 470 may be connected between the module frame 900 and the pressurizing unit 480 to be mounted on the module frame 900 by tilting the gas tank 300.

The tilting unit 470 may include a base bar 473, the hinge part 475 and a tilting elastic body 471.

The base bar 473 may be provided in a bar shape having a circular cross-section, and may be placed connected between first and second bracket plates 941 and 942 protruding from the front portion of the module frame 900.

The tilting elastic body 471 may have rings formed at both ends, and a pair of rings may be connected to a center side of the base bar 473 and a center side of the support plate 485, respectively.

In this case, in consideration of a weight balance in the second direction V2, the tilting elastic body 471 may be positioned on the center line P of the first direction V1 of the case 200.

As described above, because the support plate 485 may be connected to the gas supply unit 430, the support plate 485 may be pulled in the direction of the base bar 473 by the elastic force of the tilting elastic body 471. Accordingly, the gas supply unit 430 connected to the support plate 485 can be lifted inclined upward.

Here, the hinge part 475 may be rotatably connected to the housing block 482 with respect to the module frame 900 by the hinge pin 475a and the hinge bush 475b. Thus, due to elastic force of the tilting elastic body 471, the housing block 482, the support plate 485 and the gas supply unit 430 can be integrally placed to be inclined upward.

This arrangement is in a state in which the gas tank 300 can be inserted in an inclined direction into the gas supply unit 430. The gas tank 300 is still in a state before being mounted on the module frame 900.

As shown in FIG. 9, when a user inserts and presses the regulator valve 320 of the gas tank 300 in an inclination direction into the manifold block 450 of the gas supply unit 430, the regulator valve 320 of the gas tank 300 and the manifold block 450 of the gas supply unit 430 can be in a tightly pressurized state by the elastic force of the pressurizing elastic body 481.

Then, if the user grabs the tank handle 301 of the gas tank 300 and presses it downward, the position of the gas tank 300 can be tilted with the hinge part 475 as a rotation axis, and mounted on the tank receiving part 910 of the module frame 900.

In this case, the tank handle 301 of the gas tank 300 can be inserted into the grip part 242 of the tank fixing bar 241. In addition, the elastic force of the pressurizing elastic body 481 can be applied in the direction of the tank fixing bar 241, and the gas tank 300 can be fixed by a pressing force.

Referring to FIGS. 20 and 23 to 25, the gas supply unit 430 may be connected to the regulator valve 320 of the gas tank 300 and placed on the front portion 201 of the module frame 900 to supply gas to the stack part 410 placed on the stack receiving part 920 of the module frame 900.

The gas supply unit 430 may include the manifold block 450 and a gas supply pipe 440. The manifold block 450 may be connected to the regulator valve 320 of the gas tank 300, and the gas supply pipe 440 may be connected to and arranged between the manifold block 450 and the stack part 410.

Here, the manifold block 450 may be positioned on the center line P in the first direction V1 of the case 200 for weight balance. That is, the manifold block 450 may have a shape in which both sides of the manifold block 450 are symmetrical with respect to the center line P in the first direction V1.

The gas tank 300 inserted into the manifold block 450 may be seated in the tank receiving part 910 of the module frame 900, and the tank receiving part 910 may be formed on the center line P in the first direction V1 of the case 200 on the module frame 900. Accordingly, the gas tank 300 can be placed so that the center of gravity is positioned on the center line P in the first direction V1 of the case 200. Thus, the gas tank 300 can also balance weight in the second direction V2 of the case 200 and minimize the influence on the maneuver of the drone.

In addition, the gas tank 300 may be placed so that the center of gravity is positioned on the center line P in the first direction V1 of the case 200. In the module frame 900, a plurality of the stack receiving parts 920 may be formed on positions symmetrical to both sides of the gas tank 300, and thus, the stack parts 410 may be placed.

In this case, the gas supply pipe 440 may be branched from the manifold block 450 in a number corresponding to the plurality of stack parts 410, and the plurality of gas supply pipes 440 may be placed in a shape or position symmetrical to each other on both sides of the module frame 900, based on the center line P of the first direction V1.

Here, the gas supply pipe 440 may be connected to the upper side of the stack part 410. Accordingly, gas can be supplied from the upper side to the lower side of the stack part 410 and diffuse downward such that electrochemical reaction can be occurred.

Condensed water can be generated as a by-product by the electrochemical reaction of oxygen and hydrogen, and the condensed water can fall downwards by gravity.

If the gas supply pipe 440 is connected to a middle or lower side of the stack part 410, condensate dropping may interfere with the diffusion of gas. Such interference can be prevented by the configuration described above.

On the other hand, the regulator valve 320 may be connected to the outlet of the gas tank 300, and configured to provide the gas discharged from the gas tank 300 to be reduced and supplied to the manifold flow path 456 of the manifold block 450. Hydrogen gas may be discharged from the gas tank 300.

The regulator valve 320 may include a connector part 325 and an opening and closing part 330.

The connector part 325 may be connected to an outlet of the gas tank 300. In this case, it may be connected to the outlet of the gas tank 300 by a bolt/screw fastening structure, but is not limited thereto.

A depressurizing part 323, a gas charging part 321, a pressure sensor 322 and a temperature-responsive pressure discharging part 324 may be placed on the connector part 325.

The depressurizing part 323 may be provided to adjust the degree of decompression of the gas flowing out of the outlet of the gas tank 300.

The gas charging part 321 may be provided in the form of a valve to fill the gas tank 300 with gas. A user can simply charge gas by opening the lid 204 of the case 200 and connecting an external gas supply device and the gas charging part 321 with a hose without separating the gas tank 300.

The pressure sensor 322 may measure an internal gas pressure of the gas tank 300. Depending on the operation environment, the internal gas pressure of the gas tank 300 may be changed, and in some cases, the internal gas pressure of the gas tank 300 may reach a limit value and cause an explosion.

For example, a drone operating in a hot area may be maneuvered while exposed to high temperatures, and the internal gas pressure of the gas tank 300 may increase due to the high temperature. In this case, the pressure sensor 322 can measure the internal gas pressure of the gas tank 300 and transmit corresponding information to a user.

The temperature-responsive pressure discharging part 324 may automatically discharge the internal gas pressure of the gas tank 300 in response to the internal gas temperature of the gas tank 300. When the internal gas pressure of the gas tank 300 reaches a limit value as the gas tank 300 is exposed to a high temperature environment and the internal gas temperature of the gas tank 300 is raised, the gas can be automatically discharged and the explosion accident of the gas tank 300 can be prevented in advance.

Referring to FIGS. 23 and 24, the opening and closing part 330 may have one end connected to the connector part 325 and the other end inserted into the insertion space 452 of the manifold block 450 to open and close the flows of gas.

The opening and closing part 330 may include a valve body 334 having an internal flow path 332 and a dispersion flow path 333, a valve elastic body 337 and an opening and closing bar 336.

The valve body 334 may be implemented in a cylindrical shape, and may be inserted into the insertion space 452 formed in the manifold block 450. One side of the valve body 334 may be connected to the connector part 325, and the other side may have a valve protrusion 335 having a central portion protruding toward the manifold block 450.

The valve protrusion 335 may have a cylindrical shape. A diameter of the valve protrusion 335 may be provided smaller than a diameter of the valve body 334 connected to the connector part 325.

The internal flow path 332 may be connected to the connector part 325 and may be placed in the valve body 334. The internal flow path 332 may be a flow path for the hydrogen gas reduced by the set pressure of the depressurizing part 323 in the connector part 325.

The internal flow path 332 may include an opening and closing space 331 extending radially from the other side of the valve body 334.

In addition, the dispersion flow path 333 may be formed in the inside of the valve protrusion 335 of the valve body 334 in communication with the internal flow path 332.

The dispersion flow path 333 may be formed in a radial direction in the valve protrusion 335 so that gas is dispersed in the radial direction. A plurality of the dispersion flow paths 333 may be formed along the circumferential direction of the valve protrusion 335.

The hydrogen gas flowing out of the dispersion flow path 333 can flow into the manifold flow path 456 of the manifold block 450, and be supplied to each stack part 410 through the gas supply pipe 440.

The valve elastic body 337 may be placed in the opening and closing space 331. The valve elastic body 337 may be a coil spring or a plate spring.

The valve elastic body 337 may provide an elastic force to the opening and closing bar 336 so that the opening and closing bar 336 can be pressed in the direction of a push part 460 of the manifold block 450.

One end 336a of the opening and closing bar 336 may be supported by the valve elastic body 337 and may be placed in the opening and closing space 331 of the internal flow path 332.

The other end 336b of the opening and closing bar 336 may be placed in the through hole 335a formed in the valve protrusion 335 and protruded in the direction of the push part 460 of the manifold block 450.

The manifold block 450 may be connected between the regulator valve 320 and the stack part 410 to introduce the gas discharged through the regulator valve 320 into the stack part 410.

The manifold block 450 may include a body part 451, a link part 455, and a push part 460.

The body part 451 may have an overall cylindrical shape, and an insertion space 452 may be formed in a shape corresponding to the regulator valve 320 at one side thereof.

The insertion space 452 may include a valve protrusion receiving hole 453 which is positioned in the direction of the center line of the insertion space 452 and receives the valve protrusion 335 of the valve body 334.

The valve body 334 and the valve protrusion 335 may be inserted into the insertion space 452 and the valve protrusion receiving hole 453. The insertion space 452 and the valve protrusion receiving hole 453 may be formed in a shape corresponding thereto so that the valve body 334 and the valve protrusion 335 can be received, respectively.

The link part 455 may be placed on the other side of the body part 451. A manifold flow path 456 can be placed in the link part 455 so that the gas discharged from the regulator valve 320 inserted into the insertion space 452 is induced into the stack part 410.

Here, a plurality of the manifold flow paths 456 having a number corresponding to the number of stack parts 410 for supplying hydrogen gas may be formed on the link part 455.

The push part 460 may be placed to contact the other end 336b of the opening and closing bar 336 in the body part 451 so that the opening and closing bar 336 can be pushed.

The push part 460 may be implemented in a groove shape in which a portion of the other end 336b of the opening and closing bar 336 may be received.

It is understood that, in another exemplary embodiment, the push part 460 may be formed in a protrusion shape.

In this case, the other end 336b of the opening and closing bar 336 may be placed in the through hole 335a, and the valve protrusion 335 can be completely inserted into the insertion space 452 of the body part 451. At this time, the protrusion shape of the push part 460 can be inserted into the through hole 335a and push the other end 336b of the opening and closing bar 336.

Accordingly, the one end 336a of the opening and closing bar 336 may be separated from the contact surface of the opening and closing space 331, and the internal flow path 332 and the dispersion flow path 333 can be opened.

It is understood that although the opening and closing part 330, which is a part of the regulator valve 320, can be inserted into the manifold block 450 (e.g., the insertion space 452), this is only an example, and is not limited thereto. For example, the manifold block 450 may be inserted into the regulator valve 320.

Here, a first sealing 478 can be placed on an outer surface of the valve body 334 to prevent leakage of gas between an inner surface of the insertion space 452 and the outer surface of the valve body 334.

A second sealing 479 can be placed on an outer surface of the valve protrusion 335 to block the gas leakage at the insertion and coupling surface between the valve protrusion 335 and the valve protrusion receiving hole 453 of the manifold block 450.

The first and second sealing 478 and 479 may be O-rings, but are not limited thereto.

Here, at least one of the first and second sealings 478 and 479 may be formed of a material having elasticity. As an example, the first and second sealings 478 and 479 may be made of a material such as rubber or soft plastic.

In addition, the first sealing 478 can be compressed between the outer circumferential surface of the valve body 334 and the inner circumferential surface of the insertion space 452 of the manifold block 450, so that the valve body 334 and the manifold block 450 can be press bonded.

The second sealing 479 can be compressed between the outer circumferential surface of the valve protrusion 335 of the valve body 334 and the inner circumferential surface of the valve protrusion receiving hole 453 of the manifold block 450, and the valve protrusion 335 of the valve body 334 and the manifold block 450 can be press bonded.

That is, the valve body 334 and the manifold block 450 can have enhanced sealing force for preventing gas leakage and be coupled to each other with the applied compressive force by the first and second sealing 478 and 479.

Referring to FIG. 25, a flow control valve 490 may be placed in the manifold flow path 456 to control the flow rate of the gas discharged from the regulator valve 320 to the manifold flow path 456.

The flow control valve 490 may be an electronic control valve such as a solenoid valve, and a user can control the flow rate of the gas supplied to the stack part 410 with power control by use of the flow control valve 490 on the manifold flow path 456.

For example, a central hole 457 into which the valve protrusion 335 is inserted may be formed in the central portion of the manifold block 450. The gas discharged from the through hole 335a of the valve protrusion 335 can pass through a plurality of dispersion flow paths 333 placed along the circumference of the valve protrusion 335 and be introduced into the central hole 457. The gas introduced into the central hole 457 can pass through the branch hole 458 and be dispersed to the manifold flow path 456.

In this case, the flow control valve 490 may include a valve housing 491, a stator 492, a rotor 493 and an opening and closing piece 494. The valve housing 491 may be connected to the lower side of the manifold block 450, the stator 492 may be placed inside the valve housing 491, and the rotor 493 may be placed at the center of the stator 492. The opening and closing piece 494 may be mounted at the end of the rotor 493.

Here, the flow control valve 490 may be a normal close type valve that is in a closed state at all times. In this case, when a user applies power, the valve can be opened.

That is, when a user applies power in the state in which the opening and closing piece 494 is inserted into the branch hole 458, the rotor 493 can move in a direction opposite to the branch hole 458 due to an electromagnetic reaction. Accordingly, the opening and closing piece 494 mounted to the end of the rotor 493 may be discharged from the branch hole 458 to control the opening and closing of the branch hole 458.

If the user turns off the power to stop using the fuel cell power pack, the rotor 493 can move to the branch hole 458 again, and the opening and closing piece 494 can be inserted into the branch hole to block the flow of hydrogen gas.

Here, the flow control valve 490 may be configured to be automatically closed when a failure or emergency situation of the fuel cell power pack occurs.

In the exemplary embodiments, the flow control valve 490 may be the electronic control valve, but is not limited thereto.

Here, the flow control valve 490 can be understood as an auxiliary means for controlling the flow of hydrogen gas together with the opening and closing bar 336.

For example, when the opening and closing bar 336 is damaged or worn due to external shock or long-term use, and the opening and closing of the gas is not smooth, the opening and closing of gas can be controlled auxiliary by opening and closing the branch hole 458 with the flow control valve 490.

Because the hydrogen gas is a flammable material, the primary opening and closing structure by the opening and closing bar 336 and the push part 460 and the secondary opening and closing structure by the flow control valve 490 and the branch hole 458 can enable more stable control of gas supply.

Hereinafter, an opening and closing method according to the gas supply structure according to the exemplary embodiments will be described with reference to FIGS. 23 to 25.

A user opens the lid 204 of the case 200 and inserts the gas tank 300 in an inclination direction. The manifold block 450 of the gas supply unit 430 may be placed to be inclined upward by the elastic force of the tilting elastic body 471, so that the regulator valve 320 of the gas tank 300 can be fitted into the insertion space 452 of the manifold block 450.

The user grabs the tank handle 301 placed at the rear end of the gas tank 300 and presses it downward. Then, the gas tank 300 can tilt with the hinge part 475 as a rotation axis, and the module frame 900 can be seated in the tank receiving part 910. The tank handle 301 may be inserted into a grip part 242 of a tank fixing bar 241, which can act on the elastic force of the pressurizing elastic body 481, and the gas tank 300 can be fixed by the tank fixing bar 241.

When the valve body 334 of the regulator valve 320 is inserted into the insertion space 452 of the manifold block 450, the other end 336b of the opening and closing bar 336 can be placed in contact with the inner end of the push part 460.

When the regulator valve 320 of the gas tank 300 is inserted into the insertion space 452 of the manifold block 450 in an inclination direction, the opening and closing bar 336 can be inserted into and pressed by the push part 460. Thus, there may be a case in which the fuel gas is supplied to the stack part 410 before the gas tank 300 is seated on the tank receiving part 910 of the module frame 900.

Here, the flow control valve 490 can be a normal close type valve that is closed by default in order to prevent the opening of the flow path for supplying fuel gas and supplying the fuel gas to the stack part 410 at a point in time that a user does not want.

Accordingly, the flow control valve 490 can be opened when a user applies power, and return to the basic sealed state again when the user turns off the power to stop using the fuel cell power pack. That is, it is opened and closed by the user's power operation.

In addition, the flow control valve 490 may be configured to automatically close when a failure or emergency situation of the fuel cell power pack occurs.

That is, the flow control valve 490 can be placed in a closed state at all times by default, but by controlling a power source to open and close the valve, the supply of gas to the stack part 410 can be controlled.

When the gas tank 300 is tilted and mounted on the tank receiving part 910 of the module frame 900, the other end 336b of the opening and closing bar 336 may be pressed by the inner end of the push part 460 as shown in FIG. 24. Then, the end 336a of the opening and closing bar 336 can be separated from the contact surface 331a of the opening and closing space 331, and the gas flow path can be opened.

The flow control valve 490 may be positioned in an open state so that all gas flow paths can be connected. This operation may be proceeded later.

Thus, while one end 336a of the opening and closing bar 336 moves in the direction of the internal flow path 332 within the opening and closing space 331, the internal flow path 332 and the through hole 335a can communicate with each other.

For example, through the space between the contact surface 331a of the opening and closing space 331 and the end 335a of the opening and closing bar 336, a gas flow path can be formed. Accordingly, the internal flow path 332, the opening and closing space and the dispersion flow path 333 can communicate with each other, and the gas of the internal flow path 332 can flow into the dispersion flow path 333.

As the gas flow path is opened as described above, the gas discharged from the gas tank 300 may be first reduced by a predetermined pressure by the depressurizing part 323 of the regulator valve 320 and then flow in the direction of the internal flow path 332.

Because the internal flow path 332 and the dispersion flow path 333 can be in communication with each other by the movement of the opening and closing bar 336, as shown in the enlarged view of FIG. 24, the gas can be discharged from the internal flow path 332 to the dispersion flow path 333 though the opening and closing space 331, and then, flow into the manifold flow path 456.

In addition, gas can be supplied to each of the stack parts 410 by the gas supply pipe 440 connected to the manifold flow path 456.

The first and second sealings 478 and 479 may be placed between the outer surface of the valve body 334 and the outer surface of the valve protrusion 335, and the inner surface of the insertion space 452 to prevent external leakage of hydrogen gas.

If the gas tank 300 is to be replaced or the gas supply is to be stopped, an operator may remove the valve body 334 of the regulator valve from the insertion space 452 of the manifold block 450.

In this case, a restoring force of the valve elastic body 337 can be generated so that the opening and closing bar 336 can be pushed in the direction of the push part 460, and the one end 336a of the opening and closing bar 336 can be in close contact with the contact surface 331a of the opening and closing space 331.

Accordingly, the connection between the internal flow path 332 and the dispersion flow path 333 can be blocked from each other, and the gas supply to the manifold flow path 456 can be blocked.

Alternatively, a user can block the gas supply by closing the branch hole 458 with the flow control valve 490 by using a controller. In this case, the user does not need to remove the gas tank 300 from the case 200.

Here, when the regulator valve 320 of the gas tank 300 is inserted into the manifold block 450, the opening and closing bar 336 can be inserted into and pressed by the push part 460. Thus, there may be a case in which fuel gas is supplied to the stack part 410 before the tank 300 is seated in the tank receiving part 910 of the module frame 900.

Accordingly, the flow control valve 490 may be provided to prevent the gas from being supplied to the stack part 410 at a time that a user does not want.

A two-step gas flow control including the primary opening and closing structure by the opening and closing bar 336 and the push part 460 and the secondary opening and closing structure by the flow control valve 490 and the branch hole 458 can provide a stable gas supply system.

Referring back to FIGS. 8 to 14, the module mounting structure of the drone equipped with fuel cell power pack may include the module frame 900, the tank receiving part 910, the stack receiving part 920, a manifold receiving part 940 and a control panel receiving part 930.

The module frame 900 may be placed inside the case 200 and be made of a relatively rigid material to which components constituting the fuel cell can be mounted.

The tank receiving part 910 may be formed in the central portion of the module frame 900 and may be a component to which the gas tank 300 is mounted. The tank receiving part 910 may be processed to fit the outer shape of the gas tank 300, and the tank receiving part 910 may have a groove shape rounded in a semicircular shape.

A receiving pad 911 made of elastic material may be placed at both edges of the inner circumference of the tank receiving part 910. The receiving pad 911 may be provided so that the gas tank 300 can be seated in close contact with the tank receiving part 910 to absorb an impact that may be applied to the gas tank 300.

Here, the tank handle 301 may be placed at the lower end of the gas tank 300. The tank fixing bar 241 may be placed inside the rear portion of the case 200 and have a grip part 242 in the shape of a clamp into which the tank handle 301 of the gas tank 300 is inserted.

The elastic force caused by the pressurizing elastic body 481 can act in the direction of the tank fixing bar 241. Thus, when the tank handle 301 is inserted into the tank fixing bar 241, the gas tank 300 can be mounted and fixed to the tank receiving part 910 with the applied press force by contact.

The stack receiving part 920 may be formed on both sides of the module frame 900 and may be a component to which the stack part 410 is mounted. The stack receiving part 920 may be placed in positions symmetrical to each other on both sides of the tank receiving part 910 so as to balance weight on the module frame 900.

The stack receiving part 920 may include a first receiving surface 921 and a second receiving surface 923.

The first receiving surface 921 may be provided in a rectangular shape, and a first fastening unit 922 fixing one side of the stack part 410 may be placed. The second receiving surface 923 may be provided in a rectangular shape and be formed at a right angle to the first receiving surface 921, and a second fastening unit 924 fixing the lower surface of the stack part 410 can be placed. The stack part 410 can be fixed on the first and second receiving surfaces 921 and 923 by the first and second fastening units 922 and 924, respectively. The first and second fastening units 922 and 924 may be fastening bolts/nuts.

Here, the stack receiving part 920 may be inclined at both sides of the module frame 900 in a range of a predetermined angle $\alpha 1$ based on the vertical direction H1 of the case 200.

For example, the first receiving surface 921 may be placed to be inclined while looking at the outer downward direction of the module frame 900 with respect to the vertical direction H1 of the case 200.

Because the second receiving surface 923 is connected to the first receiving surface 921 at a right angle, the second receiving surface 923 may be placed inclined while looking at the outer downward direction of the module frame 900 based on the horizontal direction H2 of the case 200.

For example, the range of the inclination angle $\alpha 1$ of the stack receiving part 920 may be within 5° to 15°, and preferably, an inclination angle of around 5° may be adopted.

Meanwhile, the fixing panel 713 may be placed on both sides of the case 200 and may have the opening window 713a connected to one surface of the stack part 410. In this case, the fixing panel 713 may be placed in a range of an inclination angle $\alpha 2$ facing the stack part 410 placed on the first and second receiving surfaces 921 and 923. Here, it can be formed at an inclination angle of 5° to 15° in an upward direction with respect to the vertical direction H1 of the case 200. That is, the inclination angles $\alpha 1$ and $\alpha 2$ may be the same.

In addition, the sealing unit 714 may be placed along the circumference of the opening window 713a of the fixing panel 713, and may be in close contact along the circumference of the first receiving surface 921 of the stack part 410. Thus, the air passing through the stack part 410 may not be leaked, and may be provided to flow into the sealing housing 710.

The fixing panel may be placed inside the case 200, and a sealing unit 714 made of an elastic material for preventing air leakage may surround around the opening window 713a of the fixing panel 713.

If the fixing panel 713 and the sealing unit 714 are vertically placed inside the case 200, the stack receiving part 920 is also formed vertically on the module frame 900, and the stack part 410 is mounted perpendicularly to the stack receiving part 920, the interference between the one surface of the stack part 410 and the sealing unit 714 can be occurred during the insertion process when the module frame 900 is inserted into the case 200. Thus, if the insertion is forcibly conducted to overcome such interference, the friction between one surface of the stack part 410 made of metal and the surface of the sealing unit 714 made of elastic material can cause damage.

Accordingly, the stack part 410 may be placed inclined in downward direction at a certain angle α1, and the fixing panel 713 and the sealing unit 714 may be arranged with an inclination at an angle facing upward. In the process of inserting the module frame 900 into the case 200, one surface of the stack part 410 can be gently seated and close to the surface of the sealing unit 714, so that the surface damage of the sealing unit 714 can be prevented.

As described above, by arranging one surface of the stack part 410 in an inclined downward direction, the overall flow of air can be induced downward, resulting in contributing to the generation of the lift force of a drone when finally discharged from the air outlet 230.

In addition, the sealing housing 710 in which the recirculation flow path 720 and the recirculation control mechanism 722 are placed may be connected to the opening window 713a of the fixing panel 713. The duct 760 in which a plurality of blinds 740 is formed may be placed between the sealing housing 710 and the air outlets 230. Because it is arranged so as to face downwards as a whole, the air flowing from the stack part 410 to the air outlet 230 can be guided downward.

The manifold receiving part 940 may be formed on the front portion of the module frame 900, and it may be a component on which the manifold part 420 connecting the regulator valve 320 mounted on the gas tank 300 and the stack part 410 may be placed.

The manifold receiving part 940 may include a first bracket plate 941 and a second bracket plate 942.

The first bracket plate 941 may be placed to protrude toward the front portion of the module frame 900 and the second bracket pate 942 may be spaced apart from the first bracket plate 941 at a predetermined interval and placed to protrude toward the front portion of the module frame 900.

As described above, the tilting unit 470 and the pressurizing unit 480 may be connected and placed between the first and second bracket plates 941 and 942.

The base bar 473 of the tilting unit 470 may be connected and placed between the first and second bracket plates 941 and 942, and the tilting elastic body 471 may have rings formed at both ends. A pair of the rings may be connected to the center side of the base bar 473 and the center side of the support plate 485, respectively.

Here, because the support plate 485 may be connected to the gas supply unit 430, the support plate 485 may be pulled in the direction of the base bar 473 by the elastic force of the tilting elastic body 471. Accordingly, the gas supply unit 430 connected to the support plate 485 may be lifted in an upward direction before the regulator valve 320 of the gas tank 300 is mounted.

In addition, the hinge part 475 may be rotatably connected to the housing block 482 with respect to the module frame 900 by the hinge pin 475a and the hinge bush 475b. Thus, due to the elastic force of the tilting elastic body 471, the housing block 482, the support plate 485 and the gas supply unit 430 can be integrally placed on the module frame 900 to be inclined upward.

In addition, the housing block 482 of the pressurizing unit 480 can be arranged to be rotatable by being connected to the hinge part 475 between the first bracket plate 941 and the second bracket plate 942 formed to protrude from the front portion of the module frame 900.

For example, protrusions 482e may be formed on both sides of the housing block 482, and the protrusions 482e can be connected to the first and second bracket plates 941 and 942 by hinge pins 475a, respectively. In this case, for smooth rotation of the hinge pin 475a, the hinge bush 475b may be placed at the connection portion of the first and second bracket plates 941 and 942.

As described above, the tilting unit 470 and the pressurizing unit 480 may be placed between the first and second bracket plates 941 and 942, and the manifold block 450 to which the regulator valve 320 of the gas tank 300 is inserted and connected may be positioned in an inclined arrangement on the module frame 900. Thus, when the regulator valve 320 of the gas tank 300 is inserted, tilted and seated, the gas tank 300 can be firmly fixed on the tank receiving part 910 of the module frame 900 by the applied press force.

The control panel receiving part 930 may be formed under the manifold receiving part 940 on the front portion of the module frame 900 to control the regulator valve of the gas tank 300 and the stack part 410.

In this case, the control panel receiving part 930 may be placed to be inclined corresponding to the inclined arrangement of the front window 221. As described above, the control panel 830 mounted on the control panel receiving part 930 may be cooled by the air introduced from the front window 221.

The auxiliary power brackets 510 may be placed in positions symmetrical to each other on both sides of the front portion of the case 200. As described above, they can be arranged in consideration of maintaining the weight balance of the auxiliary power supply part 500 based on the center line P in the first direction V1 of the case 200.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A drone equipped with fuel cell power pack comprising:
a case including a wing part placed along an outer circumference of the case;
a module frame placed in the case;
a fuel cell unit placed in the module frame with a weight balance; and
a gas tank mounted on the module frame and connected to the fuel cell unit; and an auxillary power supply part placed in the case and connected to the fuel cell unit in parallel to supply auxiliary power, wherein a plurality of auxiliary power supply parts are placed in positions symmetrical to each other based on a center line P in a first direction V1 of the case.

2. The drone equipped with fuel cell power pack of claim 1, wherein the fuel cell unit comprises:

a manifold part placed in the module frame and connected to a regulator valve connected to the gas tank; and a stack part placed in the module frame and connected to the manifold part to receive fuel gas.

3. The drone equipped with fuel cell power pack of claim 2, wherein the manifold part and the stack part are arranged in a weight balance with respect to a second direction V2 of the case based on a center line P in a first direction V1 of the case.

4. The drone equipped with fuel cell power pack of claim 3, wherein the manifold part is placed in a front portion of the module frame, and a plurality of the stack parts are placed in positions symmetrical to each other on both sides of the module frame.

5. The drone equipped with fuel cell power pack of claim 2, wherein the gas tank and the stack part balance weight with respect to a second direction V2 of the case based on a center line P in a first direction V1 of the case.

6. The drone equipped with fuel cell power pack of claim 5, wherein a plurality of stack parts are placed in the case.

7. The drone equipped with fuel cell power pack of claim 6, wherein the gas tank and the plurality of stack parts balance weight with respect to the second direction V2 of the case based on the center line P in the first direction V1 of the case.

8. The drone equipped with fuel cell power pack of claim 7, wherein the gas tank is placed on the center line P in the first direction V1 of the case.

9. The drone equipped with fuel cell power pack of claim 8, wherein the plurality of stack parts are placed in positions symmetrical to each other on both sides of the module frame based on the gas tank.

10. The drone equipped with fuel cell power pack of claim 1, wherein a plurality of stack parts are placed in the case, and the plurality of stack parts and the plurality of auxiliary power supply parts are arranged in a weight balance with respect to a second direction V2 of the case, based on the center line P of the first direction V1 of the case.

11. A drone equipped with fuel cell power pack comprising:

a case including a wing part placed along an outer circumference of the case;

a module frame placed in the case;

a fuel cell unit placed in the module frame with a weight balance; and wherein a front window inclined in one direction is placed under a front portion of the case and a rear window inclined in a direction opposite to the front window is placed under a rear portion of the case.

12. The drone equipped with fuel cell power pack of claim 11, further comprising a discharge part, wherein the discharge part is formed on an inner lower portion of the case to collect and discharge condensed water discharged from the stack part or condensed water generated by condensing external air in the case.

13. The drone equipped with fuel cell power pack of claim 12, wherein the discharge part comprises:

a first drain flow path having a recessed shape and placed in a longitudinal direction of the front window on a lower end of the front window to collect the condensed water condensed in an inner front portion of the case; and a second drain flow path having a recessed shape and placed in a longitudinal direction of the rear window on a lower end of the rear window to collect the condensed water condensed in an inner rear portion of the case.

14. The drone equipped with fuel cell power pack of claim 13, wherein the discharge part further comprises a humidification unit placed in the first drain flow path or the second drain flow path to evaporate the condensed water collected in the first drain flow path or the second drain flow path to create a humidification environment in the case.

15. The drone equipped with fuel cell power pack of claim 14, wherein the humidification unit is a heat coil, an ultrasonic humidification sensor, or a natural convection humidifier.

16. The drone equipped with fuel cell power pack of claim 13, wherein a leg part is placed under the case for take-off and landing of the drone, and wherein the leg part comprises:

a first leg having an arch shape and placed in downward direction on a lower portion of the front window;

a second leg having an arch shape and placed in downward direction on a lower portion of the rear window; and a seating beam configured to connect ends of the first and second legs.

17. The drone equipped with fuel cell power pack of claim 16, wherein the discharge part further comprises:

a first drain pipe connected to both ends of the first drain flow path and placed along the first leg; and a second drain pipe connected to both ends of the second drain flow path and placed along the second leg.

* * * * *